United States Patent
Kume et al.

(10) Patent No.: US 12,472,950 B2
(45) Date of Patent: Nov. 18, 2025

(54) CONTROL DEVICE FOR VEHICLE AND CONTROL METHOD FOR VEHICLE

(71) Applicant: DENSO CORPORATION, Kariya (JP)

(72) Inventors: Takuya Kume, Kariya (JP); Kazuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 18/457,832

(22) Filed: Aug. 29, 2023

(65) Prior Publication Data

US 2023/0406316 A1 Dec. 21, 2023

Related U.S. Application Data

(63) Continuation of application No. PCT/JP2022/005893, filed on Feb. 15, 2022.

(30) Foreign Application Priority Data

Mar. 24, 2021 (JP) ................................. 2021-050374

(51) Int. Cl.
*B60W 30/18* (2012.01)
*B60K 35/10* (2024.01)
(Continued)

(52) U.S. Cl.
CPC ....... *B60W 30/18163* (2013.01); *B60K 35/10* (2024.01); *B60K 35/22* (2024.01); *B60K 35/23* (2024.01); *B60K 35/81* (2024.01); *B60W 30/12* (2013.01); *B60W 50/087* (2013.01); *B60W 50/14* (2013.01); *B60W 60/001* (2020.02); *G08G 1/16* (2013.01); *B60K 35/29* (2024.01);
(Continued)

(58) Field of Classification Search
None
See application file for complete search history.

(56) References Cited

U.S. PATENT DOCUMENTS 10,131,306 B2 * 11/2018 Takae .................. B60W 40/105
10,227,072 B2 * 3/2019 Kubota ................ B60W 30/09
(Continued)

FOREIGN PATENT DOCUMENTS

| CN | 110103973 A | * | 8/2019 | ...... B60W 30/18163 |
| CN | 110371120 A | * | 10/2019 | ...... B60W 30/18163 |

(Continued)

*Primary Examiner* — Kevin R Steckbauer
(74) *Attorney, Agent, or Firm* — Harness, Dickey & Pierce, P.L.C.

(57) ABSTRACT

A vehicle is capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle. A control device for the vehicle includes a lane change control unit and an adjusting unit. The lane change control unit is configured to automatically perform lane change. The adjusting unit is configured to, when the lane change control unit performs the lane change during the lane keep control and the offset control, finish the offset control and move the vehicle to a center of a travel lane of the vehicle, and subsequently cause the lane change control unit to perform the lane change.

16 Claims, 9 Drawing Sheets

(51) Int. Cl.
*B60K 35/22* (2024.01)
*B60K 35/23* (2024.01)
*B60K 35/29* (2024.01)
*B60K 35/81* (2024.01)
*B60W 30/12* (2020.01)
*B60W 50/08* (2020.01)
*B60W 50/14* (2020.01)
*B60W 60/00* (2020.01)
*G08G 1/16* (2006.01)

(52) U.S. Cl.
CPC ............... *B60K 2360/175* (2024.01); *B60K 2360/1868* (2024.01); *B60W 2050/146* (2013.01); *B60W 2554/406* (2020.02); *B60W 2554/801* (2020.02); *B60Y 2300/12* (2013.01); *B60Y 2300/18166* (2013.01)

(56) References Cited

U.S. PATENT DOCUMENTS

| | | | |
|---|---|---|---|
| 10,259,416 B2* | 4/2019 | Takae | G08G 1/166 |
| 10,647,331 B2* | 5/2020 | Fujisawa | B60K 35/10 |
| 10,663,971 B2* | 5/2020 | Sugawara | G06V 20/58 |
| 10,676,087 B2* | 6/2020 | Nishiguchi | B60W 50/10 |
| 10,676,093 B2* | 6/2020 | Nishiguchi | B60W 10/06 |
| 10,953,882 B2* | 3/2021 | Fujii | B62D 15/0265 |
| 10,967,876 B2* | 4/2021 | Asakura | B60W 50/02 |
| 11,072,334 B2* | 7/2021 | Aoki | B60W 10/20 |
| 11,173,904 B2* | 11/2021 | Hattori | B60W 60/00274 |
| 11,279,355 B2* | 3/2022 | Yoshida | B60W 60/00 |
| 11,541,889 B2* | 1/2023 | Um | B60W 30/12 |
| 11,577,730 B2* | 2/2023 | Song | B60W 60/001 |
| 11,938,940 B2* | 3/2024 | Aso | B60W 30/18163 |
| 12,304,528 B2* | 5/2025 | Min | B60W 60/0015 |
| 2017/0248959 A1* | 8/2017 | Matsubara | B60W 30/18163 |
| 2017/0274898 A1* | 9/2017 | Nakamura | G06V 20/58 |
| 2017/0291603 A1* | 10/2017 | Nakamura | B60W 30/09 |
| 2017/0349172 A1* | 12/2017 | Kubota | B60W 30/09 |
| 2018/0188735 A1* | 7/2018 | Sugawara | B60W 30/095 |
| 2018/0215387 A1* | 8/2018 | Takae | B60K 31/00 |
| 2018/0215388 A1* | 8/2018 | Takae | B60K 31/00 |
| 2018/0215389 A1* | 8/2018 | Takae | B60R 21/00 |
| 2018/0222422 A1* | 8/2018 | Takae | G06V 20/588 |
| 2018/0222423 A1* | 8/2018 | Takae | G06V 20/588 |
| 2018/0326996 A1* | 11/2018 | Fujisawa | B60K 35/28 |
| 2018/0345978 A1* | 12/2018 | Fujii | B62D 15/0255 |
| 2019/0016338 A1* | 1/2019 | Ishioka | B60W 30/18163 |
| 2019/0047561 A1* | 2/2019 | Nishiguchi | B60W 50/10 |
| 2019/0061766 A1* | 2/2019 | Nishiguchi | B62D 15/0255 |
| 2019/0071075 A1* | 3/2019 | Mimura | G06V 20/58 |
| 2019/0073540 A1* | 3/2019 | Yamada | G01S 7/24 |
| 2019/0077459 A1* | 3/2019 | Miura | B62D 15/025 |
| 2019/0265709 A1* | 8/2019 | Saikyo | B60W 30/16 |
| 2019/0315366 A1* | 10/2019 | Yoo | B60W 30/18163 |
| 2019/0315367 A1* | 10/2019 | Um | G08G 1/167 |
| 2019/0367026 A1* | 12/2019 | Hattori | G05D 1/0044 |
| 2020/0094836 A1* | 3/2020 | Aoki | B60W 10/04 |
| 2020/0094875 A1* | 3/2020 | Mimura | B60K 35/60 |
| 2020/0148205 A1* | 5/2020 | Yoshida | B60W 60/00 |
| 2021/0101600 A1* | 4/2021 | Kato | B60Q 1/40 |
| 2022/0024314 A1* | 1/2022 | Yagyu | B60K 35/23 |
| 2022/0055481 A1* | 2/2022 | Shimizu | B60K 35/28 |
| 2022/0204054 A1* | 6/2022 | Taniguchi | G08G 1/167 |
| 2022/0234586 A1* | 7/2022 | Oniwa | B60W 50/14 |
| 2022/0371585 A1* | 11/2022 | Rumler | G01S 19/42 |
| 2023/0053459 A1* | 2/2023 | You | G06V 10/765 |
| 2023/0120095 A1* | 4/2023 | Horihata | G08G 1/096775 701/301 |
| 2023/0174069 A1* | 6/2023 | Iwasaki | B60W 30/18163 701/41 |
| 2023/0182731 A1* | 6/2023 | Ishikawa | B60W 30/18163 701/93 |
| 2023/0294695 A1* | 9/2023 | Tsuda | B60W 30/12 701/96 |
| 2023/0331231 A1* | 10/2023 | Mujumdar | B60W 50/085 |
| 2023/0391352 A1* | 12/2023 | Veen | B60W 30/12 |
| 2023/0406316 A1* | 12/2023 | Kume | B60W 60/001 |
| 2024/0010216 A1* | 1/2024 | Kume | B60W 60/0059 |
| 2024/0025412 A1* | 1/2024 | Zhang | B60W 40/02 |
| 2024/0217580 A1* | 7/2024 | Uemura | B62D 15/025 |
| 2024/0246535 A1* | 7/2024 | Chiba | B60W 30/18163 |
| 2024/0270313 A1* | 8/2024 | Takahashi | B62D 15/0265 |
| 2024/0416908 A1* | 12/2024 | Taniguchi | B60W 30/10 |
| 2024/0416916 A1* | 12/2024 | Taniguchi | G08G 1/16 |

FOREIGN PATENT DOCUMENTS

| | | | | |
|---|---|---|---|---|
| CN | 110657814 A | * | 1/2020 | ............ B60W 30/12 |
| CN | 112406905 A | * | 2/2021 | ........ G06F 18/24323 |
| CN | 110103973 B | * | 5/2022 | ............ B60W 40/08 |
| DE | 102011016770 A1 | * | 11/2011 | ............ B60W 10/20 |
| DE | 102011016771 A1 | * | 10/2012 | ............ B60W 30/10 |
| DE | 102015219934 A1 | * | 4/2017 | ...... B60W 30/18163 |
| DE | 112016006455 T5 | * | 12/2018 | ............ B60W 50/08 |
| DE | 102015219934 B4 | * | 5/2022 | ...... B60W 30/18163 |
| DE | 102020132607 A1 | * | 6/2022 | ............ B60W 30/12 |
| DE | 102022002969 A1 | * | 2/2024 | ...... B60W 30/18163 |
| DE | 102023207613 B3 | * | 9/2024 | ............ G08G 1/168 |
| EP | 3357777 A1 | * | 8/2018 | ......... B60W 30/095 |
| EP | 3552902 A1 | * | 10/2019 | ............ G08G 1/167 |
| EP | 3357777 B1 | * | 7/2021 | .......... G06V 20/588 |
| EP | 4180295 A1 | * | 5/2023 | ...... B60W 60/00276 |
| EP | 4316934 A1 | * | 2/2024 | ...... B60W 30/18163 |
| FR | 3043974 A1 | * | 5/2017 | ...... B60W 30/18163 |
| FR | 3043974 B1 | * | 12/2017 | |
| FR | 3142153 A1 | * | 5/2024 | ...... B60W 30/18163 |
| JP | 2006321299 A | * | 11/2006 | |
| JP | 2016000602 A | * | 1/2016 | |
| JP | 2017061249 A | * | 3/2017 | |
| JP | 2017219925 A | * | 12/2017 | ...... B60W 30/18163 |
| JP | 2020185982 A | * | 11/2020 | |
| JP | WO2019142284 A1 | * | 1/2021 | ........ B60W 60/0055 |
| JP | 6947849 B2 | * | 10/2021 | ............ B60W 30/12 |
| JP | 2022148625 A | * | 10/2022 | ............... G08G 1/16 |
| JP | 2022151544 A | * | 10/2022 | |
| JP | 2023536483 A | * | 8/2023 | .......... B60W 60/001 |
| WO | WO-2017064330 A1 | * | 4/2017 | ......... B62D 15/0255 |
| WO | WO-2017141788 A1 | * | 8/2017 | ............. G01C 21/26 |
| WO | WO-2019043847 A1 | * | 3/2019 | ............ B60W 50/00 |
| WO | WO-2019142284 A1 | * | 7/2019 | ............. B62D 6/00 |
| WO | WO-2020208989 A1 | * | 10/2020 | ............ B60K 35/81 |
| WO | WO-2020225989 A1 | * | 11/2020 | ............ B60K 35/81 |
| WO | WO-2021075160 A1 | * | 4/2021 | ............ B60K 35/81 |
| WO | WO-2022022384 A1 | * | 2/2022 | ...... B60W 60/00276 |
| WO | WO-2022201972 A1 | * | 9/2022 | ............... G08G 1/16 |
| WO | WO-2022213373 A1 | * | 10/2022 | ...... B60W 30/18163 |
| WO | WO-2024037812 A1 | * | 2/2024 | ...... B60W 30/18163 |
| WO | WO-2024074857 A1 | * | 4/2024 | ............ G06V 20/588 |
| WO | WO-2024110706 A1 | * | 5/2024 | ...... B60W 30/18163 |
| WO | WO-2024181310 A1 | * | 9/2024 | ............... G08G 1/16 |

\* cited by examiner

CONTROL DEVICE FOR VEHICLE AND CONTROL METHOD FOR VEHICLE

CROSS REFERENCE TO RELATED APPLICATION

The present application is a continuation application of International Patent Application No. PCT/JP2022/005893 filed on Feb. 15, 2022, which designated the U.S. and claims the benefit of priority from Japanese Patent Application No. 2021-050374 filed on Mar. 24, 2021. The entire disclosures of all of the above applications are incorporated herein by reference.

TECHNICAL FIELD

The present disclosure relates to a control device for a vehicle and a control method for a vehicle.

BACKGROUND

Conventionally, development has been made to provide a vehicle system that does not obligate a driver of a vehicle to monitor the surrounding of the vehicle when the vehicle travels at a high level of automated driving.

SUMMARY

According to an aspect of the present disclosure, a vehicle is capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle. A control device for the vehicle is configured to automatically perform lane change.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
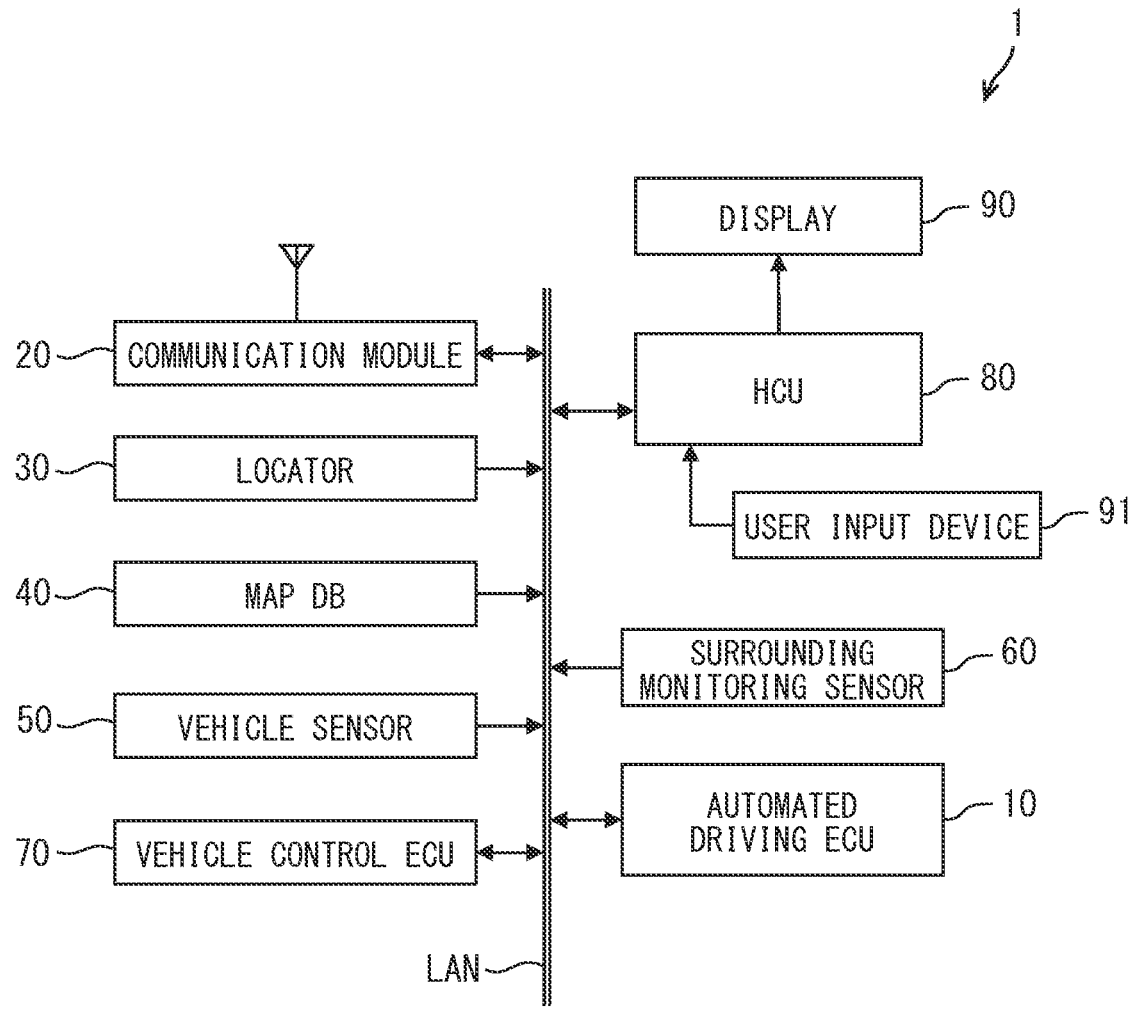
FIG. 1 is a diagram illustrating an example of a schematic configuration of a system for a vehicle.

Hereinafter, examples of the present disclosure will be described.

According to an example of the present disclosure, a configuration of a vehicle system is employable. Specifically, when a vehicle travels at a high level of automated driving, the vehicle system does not obligate a driver of the vehicle to monitor the surrounding of the vehicle. In addition, the vehicle system performs an offset control to offset the travel position of the vehicle in a width direction of the vehicle so as to increase a distance from another vehicle travelling side by side of the vehicle. In addition, the vehicle system performs a vehicle control including lane keeping at the high level of automated driving.

Assumably, the vehicle system may not sufficiently consider a lane change at the time of automated driving. In a case where the vehicle system performs a lane change while performing the offset control, when an occupant cannot easily notice these controls, the occupant would become anxious, and convenience for the occupant would deteriorate.

In the lane change, in the case where the offset control is performed at the time of automated driving including lane keeping, a plurality of travel controls such as lane keeping, an offset control, and a lane change are related. It is, therefore, considered to be desirable to perform the lane change smoothly.

According to an example of the present disclosure, a control device is for a vehicle. The vehicle is capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle. The control device comprises: a lane change control unit configured to automatically perform lane change; and an adjusting unit configured to, when the lane change control unit performs the lane change during the lane keep control and the offset control, finish the offset control and move the vehicle to a center of a travel lane of the vehicle, and subsequently cause the lane change control unit to perform the lane change.

According to an example of the present disclosure, a control device is for a vehicle. The vehicle is capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle. The control device comprises: a lane change control unit configured to automatically perform lane change; and an adjusting unit configured to, when the lane change control unit performs the lane change during the lane keep control and the offset control, cause the lane change control unit to perform the lane change from the travel position of the vehicle, which has been offset by the offset control.

In the above-described configuration, the vehicle system performs the lane change during execution of the lane keeping control and the offset control. Subsequently, the vehicle system finishes the offset control and moves the vehicle to the center of the lane on which the vehicle is travelling. Consequently, the occupant easily notices that, after the offset control is finished, the lane change had been performed. As a result, with respect to the lane change in the case where the offset control is performed at the time of the automated driving including the lane keeping, the configuration enables to prevent decrease in the convenience and lessen anxiety of the occupant.

According to an example of the present disclosure, a control method is for a vehicle. The vehicle is capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle. The control method is to be executed by at least one processor and comprises: automatically performing a lane change in a lane change control process; and finishing the offset control and moving the vehicle to a center of a travel lane of the vehicle, when the lane change control process is caused to perform the lane change during the lane keep control and the offset control, and subsequently causing the lane change control process to perform the lane change, in an adjusting process.

According to an example of the present disclosure, a control method is for a vehicle. The vehicle is capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle. The control method is to be executed by at least one processor and comprises: automatically performing a lane change in a lane change control process; and causing the lane change control process to perform the lane change from the travel position of the vehicle, which has been offset by the offset control, in an adjusting process, when the lane change control process is caused to perform the lane change during the lane keep control and the offset control.

With the above configuration, in the case of performing the lane change in the lane change control process during execution of the lane keeping control and the offset control, the lane change is performed from the travel position of the vehicle which is offset by the offset control. The configuration enables smooth shift from the offset control state to the lane change. As a result, the configuration enable to perform more smoothly the lane change in the case where the offset control is performed at the time of automated driving including lane keeping.

With reference to the diagrams, a plurality of embodiments for the disclosure will be described. For convenience of description, in the plurality of embodiments, the same reference numeral is designated to a part having the same function as that in a drawing described until then, and description of the part may be omitted. With respect to the part having the same reference numeral, its description in another embodiment can be referred to.

First Embodiment

<Schematic Configuration of System 1 for Vehicle>

Hereinafter, a first embodiment of the present disclosure will be described with reference to the drawings. A system 1 for a vehicle illustrated in FIG. 1 can be used for a vehicle capable of performing automated driving (hereinbelow, automated driving vehicle). As illustrated in FIG. 1, the system 1 for a vehicle includes an automated driving ECU 10, a communication module 20, a locator 30, a map database (hereinafter, map DB) 40, a vehicle sensor 50, a surrounding monitoring sensor 60, a vehicle control ECU 70, an HCU (Human Machine Interface Control Unit) 80, a display device 90, and a user input device 91. For example, the automated driving ECU 10, the communication module 20, the locator 30, the map DB 40, the vehicle sensor 50, the surrounding monitoring sensor 60, the vehicle control ECU 70, and the HCU 80 are connected to an in-vehicle LAN (refer to LAN in FIG. 1). A vehicle using the system 1 for a vehicle is not always limited to an automobile. In the following, the case of using it for an automobile will be described as an example.

As levels of automated driving (hereinbelow, automation levels) of an automated driving vehicle, for example, as the SAE defines, a plurality of levels can exist. The automation level is divided into, for example, LV0 to LV5 described as follows.

LV0 is a level at which the system does not intervene and the driver executes all of driving tasks. The driving tasks may be also said as dynamic driving tasks. The driving tasks are, for example, steering, acceleration/deceleration, and surrounding monitoring. LV0 corresponds to so-called manual driving. LV1 is a level at which the system assists either steering or acceleration/deceleration. LV1 corresponds to so-called driving assistance. LV2 is a level at which the system assists both steering and acceleration/deceleration. LV2 corresponds to so-called partial driving automation. LV1 and LV2 are also a part of the automated driving.

For example, the automated driving of LV1 and LV2 are automated driving in which the driver has monitoring obligation related to safe driving (hereinafter, simply called monitoring obligation). That is, it corresponds to automated driving with monitoring obligation. The monitoring obligation includes visual surrounding monitoring. The automated driving of LV1 and LV2 can be also said as automated driving which does not allow a second task. The second task is an action other than driving allowed to the driver and is a specific action which is specified in advance. The second tasks can be also said as secondary activities, other activities, and the like. The second task should not hinder the driver from dealing with a driving operation takeover request from the automated driving system. It is assumed that the second tasks are, for example, viewing of content such as video, operation of a smartphone or the like, reading, meal, and the like.

The automated driving of LV3 is a level at which the system can execute all of the driving tasks under specific conditions and the driver performs the driving operation in an emergency. In the automated driving of LV3, when the system makes a driving takeover request, the driver is required to promptly react to it. The driving takeover can be also said as devolution of the surrounding monitoring obligation from the system on the vehicle side to the driver. LV3 corresponds to so-called conditional driving automation. As LV3, there is area-limited LV3 which is limited to a specific area. The specific area in this case may be a car-dedicated road and a highway. The specific area may be, for example, a specific lane. Another LV3 is traffic-congestion-limited LV3 which is limited to the time of traffic congestion. Traffic-congestion-limited LV3 is limited to, for example, the time of traffic congestion on a car-dedicated road or highway.

Automated driving of LV4 is at a level the system can execute all of driving tasks except for specific situations such as roads which cannot be handled, extreme environment, and the like. LV4 corresponds to so-called high driving automation. Automated driving of LV5 is at a level the system can execute all of the driving tasks under every environment. LV5 corresponds to so-called full driving automation.

For example, the automated driving at LV3 to LV5 is automated driving in which the driver does not have monitoring obligation. That is, it corresponds to automated driving without monitoring obligation. The automated driving at LV3 to LV5 can be also said as automated driving which allows second tasks. In the automated driving of the levels 3 to 5, the automated driving of level 4 or higher corresponds to automated driving which allows sleeping of the driver. In the automated driving of the levels 3 to 5, the automated driving of level 3 corresponds to the automated driving which does not allow sleeping of the driver.

It is assumed that the automation levels of the automated driving vehicle of the embodiment can be switched. The automation level may be switched only between levels as a part of LV0 to LV5. In the embodiment, as an example, the case where an automated driving vehicle can switch the automated driving of LV3, the automated driving of LV2, the automated driving of LV1, and the manual driving of LV0 will be described.

The communication module 20 transmits/receives information to/from a center on the outside of the vehicle via wireless communication. That is, wide area communication is performed. The communication module 20 receives traffic congestion information or the like around the vehicle from the center by the wide area communication. The communication module 20 may transmit/receive information to/from another vehicle via wireless communication. That is, vehicle-to-vehicle communication may be performed. The communication module 20 may transmit/receive information to/from a roadside device mounted on the road side via wireless communication. That is, vehicle roadside communication may be performed. In the case of performing vehicle roadside communication, the communication module 20 may receive information of a surrounding vehicle transmitted from a vehicle surrounding a subject vehicle via a roadside device. The communication module 20 may receive information of a surrounding vehicle transmitted from a vehicle surrounding the subject vehicle by wide area communication via the center.

The locator 30 has a GNSS (Global Navigation Satellite System) receiver and an inertial sensor. The GNSS receiver receives positioning signals from a plurality of positioning satellites. The inertial sensor has, for example, a gyroscope sensor and an acceleration sensor. The locator 30 sequentially measures the position of the subject vehicle (hereinafter, subject vehicle position) in which the locator 30 is mounted by combining the positioning signals received by the GNSS receiver and a result of measurement of the inertial sensor. It is assumed that the subject vehicle position is expressed by, for example, coordinates of latitude and longitude Alternatively, for measuring the subject vehicle position, a travel distance obtained from signals sequentially output from a vehicle speed sensor mounted on the subject vehicle may be also used.

The map DB 40 is a nonvolatile memory and stores high-precision map data. The precision of the high-precision map data is higher than that of map data used for route guidance in the navigation function. In the map DB 40, map data used for route guidance may be also stored. The high-precision map data includes information which can be used for automated driving such as, for example, three-dimensional shape information of roads, information of the number of lanes, and information indicating the travel direction permitted to each lane. In addition, the high-precision map data may include, for example, information of node points indicating positions of both ends of a pavement mark such as a compartment line. The locator 30 may have a configuration provided with no GNSS receiver by using three-dimensional shape information of roads. For example, the locator 30 may specify the position of the subject vehicle by using three-dimensional shape information of roads and a result of detection by the surrounding monitoring sensor 60 such as LIDAR (Light Detection and Ranging/Laser Imaging Detection and Ranging) detecting a group of characteristic points of a road shape and a structural object or a surrounding monitoring camera. The three-dimensional shape information of roads may be generated on the basis of captured images by REM (Road Experience Management).

The communication module 20 may receive map data distributed from an external server by, for example, wide area communication and store it in the map DB 40. In this case, another configuration may be employed that a volatile memory is used as the map DB 40 and the communication module 20 sequentially obtains map data of a region corresponding to the position of the subject vehicle.

The vehicle sensor 50 is made by a sensor group for detecting various states of the subject vehicle. As the vehicle sensor 50, there are a vehicle speed sensor detecting vehicle speed, a steering sensor detecting steering angle, and the like. As the vehicle sensor 50, there is a direction indicator switch for detecting an operation of turning on a turn signal lamp as a direction indicator. The vehicle sensor 50 outputs the detected information to an in-vehicle LAN. The information detected by the vehicle sensor 50 may be output to the in-vehicle LAN via the ECU mounted in the subject vehicle.

The surrounding monitoring sensor 60 monitors the environment surrounding the subject vehicle. As an example, the surrounding monitoring sensor 60 detects hindrances around the subject vehicle, which are a moving object such as a pedestrian or another vehicle and a stationary object such as an object dropped on a road. In addition, the surrounding monitoring sensor 60 detects pavement marks such as travel compartment lines around the subject vehicle. The surrounding monitoring sensor 60 is, for example, a sensor such as a surrounding monitoring camera capturing an image of a predetermined range around the subject vehicle, a millimeter-wave radar, a sonar, a LIDAR or the like transmitting search waves to a predetermined range around the subject vehicle. The surrounding monitoring camera sequentially outputs images sequentially captured as sensing information to the automated driving ECU 10. The sensor transmitting search waves such as a sonar, a millimeter-wave radar, a LIDAR, or the like sequentially outputs scan results based on reception signals obtained in the case of receiving waves reflected by a hindrance as sensing information to the automated driving ECU 10. The sensing information detected by the surrounding monitoring sensor 60 may be output to the automated driving ECU 10 not through the in-vehicle LAN.

The vehicle control ECU 70 is an electronic control unit performing travel control of the subject vehicle. As the travel control, acceleration/deceleration control and/or steering control can be mentioned. As the vehicle control ECU 70, there are a steering ECU performing steering control, a power unit control ECU and a brake ECU performing acceleration/deceleration control, and the like. The vehicle control ECU 70 performs travel control by outputting control signals to each of travel control devices such as an electronic control throttle, a brake actuator, an EPS (Electric Power Steering) motor, and the like mounted in the subject vehicle.

The HCU 80 is configured by a computer, as a main body, including a processor, a volatile memory, a nonvolatile memory, an 1/O, and a bus connecting those components. The HCU 80 executes various processes related to communications between an occupant and the system of the subject vehicle by executing the control program stored in the nonvolatile memory.

The display device 90 is provided for the subject vehicle and presents information to the driver of the subject vehicle, by displaying information, the display device 90 performs the information presentation. The display device 90 performs the information presentation in accordance with an instruction of the HCU 80. The display device 90 may present information also to an occupant other than the driver. As the display device 90, for example, a meter MID (Multi Information Display), a CID (Center Information Display), or an HUD (Head-Up Display) can be used. The meter MID is a display device provided in front of the driver's seat in the vehicle compartment. As an example, the meter MID may be provided in a meter panel. The CID is a display device disposed in the center of an instrument panel of the subject vehicle. The HUD is provided, for example, in the instrument panel in the vehicle compartment. The HUD projects a display image formed by a projector to a projection region specified in a front window shield as a projection member. The light of the image reflected to the inside of the vehicle compartment by the front window shield is perceived by the driver sitting on the driver's seat. In such a manner, the driver can visually recognize a virtual image of the display image formed in front of the front window shield so as to be overlapped with a part of the front view. The HUD may have a configuration to project the display image to a combiner provided in front of the driver's seat in place of the front window shield.

The user input device 91 receives an input from the user. The user input device 91 may be an operation device receiving an operation input from the user. The operation device may be a mechanical switch or a touch switch integrated with the display device 90. The user input device 91 is not limited to the operation device receiving an operation input as long as a device receives an input from the user. For example, a voice input device receiving an input of a command by voice of the user may be employed.

The automated driving ECU 10 is configured by using a computer, as a main body, having a processor, a volatile memory, a nonvolatile memory, an 1/O, and a bus connecting those components, by executing a control program stored in the nonvolatile memory, the automated driving ECU 10 executes processes related to the automated driving. The automated driving ECU 10 corresponds to a control device for a vehicle. The configuration of the automated driving ECU 10 will be specifically described hereinafter.

<Schematic Configuration of Automated Driving ECU 10>

Figure 2:
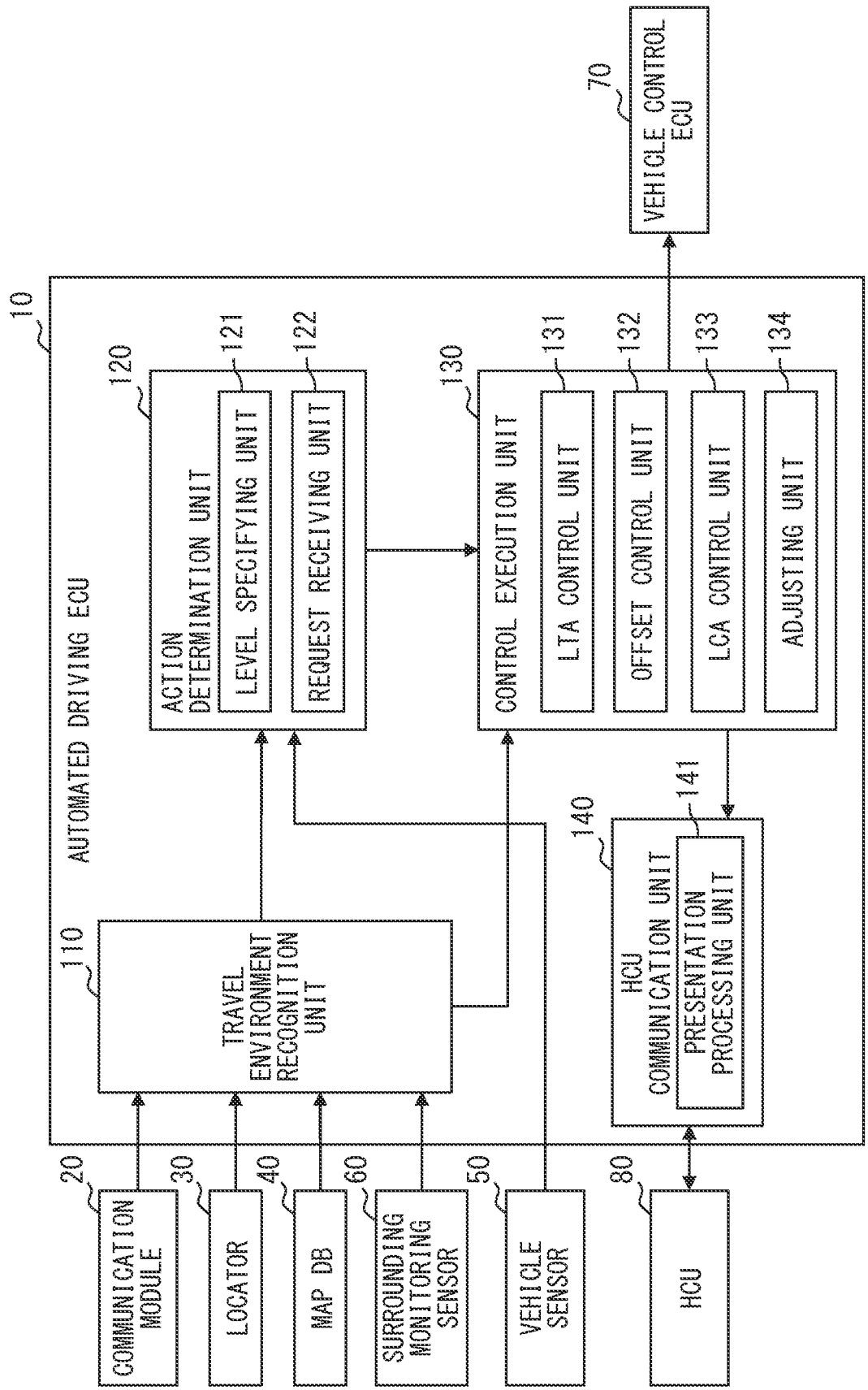
FIG. 2 is a diagram illustrating an example of a schematic configuration of an automated driving ECU.

Subsequently, the schematic configuration of the automated driving ECU 10 will be described with reference to FIG. 2. As illustrated in FIG. 2, the automated driving ECU 10 has, as functional blocks, a travel environment recognition unit 110, an action determination unit 120, a control execution unit 130, and an HCU communication unit 140. Execution of processes of the function blocks of the automated driving ECU 10 by a computer corresponds to execution of a control method for a vehicle. A part or all of the functions executed by the automated driving ECU 10 may be configured in a hardware manner by one or a plurality of ICs or the like. A part or all of the functional blocks of the automated driving ECU 10 may be realized by a combination of execution of software by a processor and a hardware member.

The travel environment recognition unit 110 recognizes the travel environment around the subject vehicle on the basis of the sensing information obtained from the surrounding monitoring sensor 60. As an example, the travel environment recognition unit 110 recognizes the detailed position of the subject vehicle in a lane on which the subject vehicle travels (hereinbelow, subject vehicle lane) from information such as right and left compartment lines of the subject vehicle lane. In addition, the travel environment recognition unit 110 recognizes the position, size, and speed of a hinderance such as a vehicle around the subject vehicle. The travel environment recognition unit 110 recognizes the position, size, and speed of a hindrance such as a vehicle in the subject vehicle lane. The travel environment recognition unit 110 also recognizes the position, size, and speed of a hindrance such as a vehicle in a peripheral lane of the subject vehicle lane. The peripheral lane may be, for example, a lane adjacent to the subject vehicle lane. Alternatively, the peripheral lane may be a lane other than the subject vehicle lane in a road section in which the subject vehicle is located.

The travel environment recognition unit 110 may recognize the travel environment surrounding the subject vehicle on the basis of, other than the sensing information obtained from the surrounding monitoring sensor 60, the subject vehicle position obtained from the locator 30, map data obtained from the map DB 40, information of other vehicles obtained by the communication module 20, and the like. As an example, the travel environment recognition unit 110 generates a virtual space which reproduces an actual travel environment by using those information.

The travel environment recognition unit 110 may also determine a manual driving area (hereinafter, MD area) in the travel region of the subject vehicle. The travel environment recognition unit 110 may also determine an automated driving area (hereinafter, AD area) in the travel region of the subject vehicle. The travel environment recognition unit 110 may also discriminate between an ST section and a non-ST section which will be described later in the AD area.

The MD area is an area in which automated driving is inhibited. In other words, the MD area is an area which is specified that the driver executes all of a vertical-direction control and a lateral-direction control of the subject vehicle, and the surrounding monitoring. The vertical direction is a direction matching a front-back direction of the subject vehicle. The lateral direction is a direction matching a width direction of the subject vehicle. The vertical-direction control corresponds to acceleration/deceleration control of the subject vehicle. The lateral-direction control corresponds to steering control of the subject vehicle. For example, ordinary roads may be set as the MD area.

The AD area is an area in which automated driving is allowed. In other words, the AD area is an area specified that the subject vehicle can perform one or more of the vertical-direction control, the lateral-direction control, and the surrounding monitoring. For example, highways and car-only roads may be set as the AD area. It is sufficient to allow the automated driving at the traffic-congestion-limited LV3 (hereinafter, traffic-congestion-limited automated driving), for example, only at the time of traffic congestion in the AD area.

The AD area is divided into the ST section and the non-ST section. The ST section is a section in which the automated driving of the area-limited LV3 (hereinafter, area-limited automated driving) is allowed. The area-limited automated driving may be allowed only in a specific lane in the ST section. The non-ST section is a section in which the automated driving of LV2 or lower can be performed. In the embodiment, the non-ST section in which the automated driving of LV1 is allowed and the non-ST section in which the automated driving of LV2 are not distinguished. It is sufficient to set that the ST section is, for example, a travel section in which the high-precision map data is prepared. It is sufficient to set that the non-ST section is a section which does not correspond to the ST section in the AD area.

The action determination unit 120 switches the control primary body of the driving operation between the driver and the system of the subject vehicle. When the system side has the driving operation control right, the action determination unit 120 determines a travel plan to make the subject vehicle travel on the basis of a result of recognition of the travel environment by the travel environment recognition unit 110. As the travel plan, it is sufficient to determine a route to a destination and actions to be taken by the subject vehicle to reach the destination. Examples of the actions are straight travel, right turn, left turn, lane change, and the like.

The action determination unit 120 has a level specifying unit 121 and a request receiving unit 122 as sub function blocks. The level specifying unit 121 specifies the automation level of the subject vehicle at the present time point. The level specifying unit 121 can specify the area-limited LV3 and the traffic-congestion-limited LV3 so as to be distinguished from each other. The area-limited LV3 and the traffic-congestion-limited LV3 are levels obtained by further subdividing the automation LV3.

The request receiving unit 122 receives a request of LCA which will be described later. A request of LCA can be also said as a request for a lane change. LCA (Lane Change Assist) is a travel control of automatically performing a lane change. The LCA request may be made by any of input from an occupant of the subject vehicle (hereinafter, occupant input) and determination on the system side of the subject vehicle (hereinafter, system determination). An input from an occupant may be, for example, operation of the turn signal lever. Operation of the turn signal lever may be determined from a signal of a turn signal lever switch in the vehicle sensor 50. The LCA request made by an input from an occupant of the subject vehicle is received only during automated driving at an automation level in which the LCA can be executed. The system determination may be a result of determination in the action determination unit 120. The case where the LCA is requested by the system side is, for example, the case where the speed of a vehicle ahead of the subject vehicle is low speed which is equal to or lower than a predetermined value. In addition, the case where a lane change is necessary since the number of lanes decreases, the case where a lane change is necessary for a right/left turn, and the like can be also mentioned.

The request receiving unit 122 can preliminarily set which one of an occupant input and the system determination is received as an LCA request. The setting of receiving which one of the occupant input and the system determination as the LCA request may be performed, for example, in accordance with an input received by the user input device 91. Alternatively, it may be set by a dealer or the like.

In the case where the system side has the control right of the driving operation, the control execution unit 130 executes various controls for making the subject vehicle travel in accordance with a travel plan determined by the action determination unit 120 in cooperation with the vehicle control ECU 70. The control execution unit 130 has, as sub function blocks, an LTA (Lane Tracing Assist) control unit 131, an offset control unit 132, an LCA control unit 133, and an adjusting unit 134.

The LTA control unit 131 executes LTA control as control of maintaining travel within the lane of the subject vehicle. In the LTA control, steering control is performed so as to maintain the travel in the lane of the subject vehicle. That is, the LTA control performs lane keeping control as automatic lane keeping. It is sufficient that the LTA control unit 131 keeps travel in a lane by, for example, controlling the steering angle of the steering wheel of the subject vehicle on the basis of compartment lines and positions and shapes of road ends recognized by the travel environment recognition unit 110. It is sufficient that, for example, the LTA control unit 131 controls so that the center of the subject vehicle lane becomes the travel position of the subject vehicle by default. In the case of adjusting the travel position of the subject vehicle to the center of the subject vehicle lane, for example, it is sufficient to adjust the center of the axle of the subject vehicle to the center of the subject vehicle lane.

The offset control unit 132 performs offset control to make the travel position of the subject vehicle offset in the vehicle width direction so as to increase the distance from a vehicle, which travels side-by-side with the subject vehicle, automatically. For example, in the offset control, when the distance from a vehicle traveling side by side becomes a threshold or less, it is sufficient to make the travel position of the subject vehicle offset so as to have a space larger than the threshold between the subject vehicle and the side-by-side traveling vehicle. The threshold in this case may be a value which can be set arbitrarily. In the case where the offset control is performed on both of vehicles traveling on the right and left sides of the subject vehicle, the subject vehicle is offset so as to have a distance from each of the vehicles on the right and left sides.

In the case where the offset control is executed during execution of the LTA control, the LTA control unit 131 controls so as to keep traveling in a lane while making the travel position of the subject vehicle offset in the vehicle width direction so as to increase the distance from a vehicle traveling side by side. Also in the case that the travel position of the subject vehicle is deviated from the center of the subject vehicle lane by the offset control, the LTA control unit 131 makes the vehicle keep traveling in the lane while being deviated from the center of the subject vehicle lane. In the case where the offset control is finished during execution of the LTA control, the LTA control unit 131 resets the travel position of the subject vehicle from the offset position to the center of the subject vehicle lane and makes the subject vehicle keep traveling in the center of the subject vehicle lane.

The LCA control unit 133 makes the lane change performed automatically. The LCA control unit 133 corresponds to a lane change control unit. The process in the LCA control unit 133 corresponds to a lane change control process. The LCA control unit 133 performs the LCA control to make the subject vehicle automatically change from the subject vehicle lane to an adjacent lane. In the LCA control, based on a result of recognition of the travel environment by the travel environment recognition unit 110 or the like, a planned travel path in a shape smoothly connecting a target position in the subject vehicle lane and the center of an adjacent lane is generated, by automatically controlling the steering angle of the steering wheel of the subject vehicle in accordance with the planned travel path, the lane change is performed from the subject vehicle lane to the adjacent lane. When a condition that the surrounding situation allows the lane change (hereinafter, surrounding condition) and a condition that the request of LCA is received by the request receiving unit 122 (hereafter, request condition) are satisfied, the LCA control unit 133 starts the automatic lane change. In the case of starting the lane change by the LCA control, it is sufficient to temporarily interrupt the LTA control by the adjusting unit 134 which will be described later to enable release from the subject vehicle lane. After completion of the lane change, the adjusting unit 134 restarts the LTA control.

In the embodiment, although description is omitted for convenience, the control execution unit 130 may also perform travel controls such as ACC (Adaptive Cruise Control) other than the LTA control, the offset control, and the LCA control. The ACC is a control realizing constant-speed travel of the subject vehicle at set vehicle speed or travel tracing a preceding vehicle.

The adjusting unit 134 adjusts the travel control executed by the control execution unit 130. The process in the adjusting unit 134 corresponds to an adjusting process. In the case where a lane change is performed by the LCA control unit 133 during execution of the LTA control and the offset control and in the case where the travel position of the subject vehicle has been offset to the side opposite to a direction in which the lane change is to be performed by the offset control, the adjusting unit 134 finishes the offset control, moves the subject vehicle to the center of the subject vehicle lane and, subsequently, makes the lane change performed by the LCA control unit 133. In such a manner, the occupant easily notices that after finishing the offset control, the lane change is performed. To make the occupant recognize easily that the offset control is finished, after lapse of predetermined time since the subject vehicle was moved to the center of the subject vehicle lane, the operation may be shifted to the lane change. The subject vehicle may be moved to the center of the subject vehicle lane by, for example, the LTA control of the LTA control unit 131.

On the other hand, in the case of making the lane change performed by the LCA control unit 133 during execution of the LTA control and the offset control and in the case where the travel position of the subject vehicle has been offset by the offset control to the side to which the lane change is to be performed, the adjusting unit 134 may make the lane change performed from the travel position of the subject vehicle which is offset by the offset control (that is, the offset position). In this case, it is sufficient to make the lane change performed from the offset position while continuing the offset control. Alternatively, although the offset control is finished, without moving the subject vehicle to the center of the subject vehicle lane, the lane change may be performed from the offset position. In such a manner, the operation can be smoothly shifted to the lane change from the offset-control state.

In the case of making the lane change performed by the LCA control unit 133 during execution of the LTA control and the offset control and in the case where the travel position of the subject vehicle has been offset by the offset control in a direction that is opposite to a direction in which the lane change is to be performed, even when the LCA request is received by the request receiving unit 122, preferably, the adjusting unit 134 finishes the offset control, moves the subject vehicle to the center of the subject vehicle lane and, subsequently, makes the lane change performed by the LCA control unit 133. In the case where the travel position of the subject vehicle is has been offset to the side opposite to a direction in which the lane change is to be performed, a side-by-side traveling vehicle exists on the side to which the lane change is performed. In this case, even when the LCA request is received by the request receiving unit 122, the possibility that the lane change cannot be started immediately is high. Therefore, it is preferable to finish the offset control, move the subject vehicle to the center of the subject vehicle lane and, subsequently, make the lane change performed by the LCA control unit 133.

In the case of making the lane change performed by the LCA control unit 133 during execution of the LTA control and the offset control, even in the case where the travel position of the subject vehicle has been offset by the offset control in a direction that is opposite to a direction in which the lane change is to be performed, when the LCA request made by the occupant input is received by the request receiving unit 122, the adjusting unit 134 may make the lane change performed from the offset position. The reason is that, when the occupant desires a lane change, even a lane change is performed from the offset position on the side opposite to a direction in which the lane change is performed, the occupant may feel less anxiety. It is therefore considered that the advantage that the lane change becomes smooth is greater than the anxiety.

In the case of making the lane change performed by the LCA control unit 133 during automated driving without monitoring obligation and during execution of the LTA control and the offset control, regardless of whether the travel position of the subject vehicle has been offset to the side to which the lane change is to be performed or the travel position of the subject vehicle has been offset to the side opposite to a direction in which the lane change is to be performed by the offset control, preferably, the adjusting unit 134 finishes the offset control, moves the subject vehicle to the center of the subject vehicle lane, and makes the lane change performed by the LCA control unit 133. During automated driving without monitoring obligation, the possibility that an occupant does not grasp the circumstances around the subject vehicle is high. Therefore, it is considered that the occupant feels more anxiety over the travel control. As a measure for it, with the above-described configuration, the offset control is finished regardless of the direction of the offset, the subject vehicle is moved to the center of the subject vehicle lane and, subsequently, the lane change is performed. Consequently, the occupant notices the control content more easily. As a result, the occupant feels less anxiety.

In the case of making the lane change performed by the LCA control unit 133 during the traffic-congestion-limited automated driving and during execution of the LTA control and the offset control, regardless of whether the travel position of the subject vehicle has been offset to the side to which the lane change is to be performed or the travel position of the subject vehicle has been offset to the side opposite to a direction in which the lane change is to be performed by the offset control, the adjusting unit 134 moves the travel position of the vehicle to the side to which the lane change is to be performed and, subsequently, makes the lane change performed by the LCA control unit 133. In such a manner, even in the case where it is difficult to perform acceleration at the time of the lane change in traffic congestion, by moving the travel position of the subject vehicle toward the side to which the lane change is to be performed, the lane change can be facilitated. The traffic-congestion-limited automated driving is, as described above, the automated driving at the traffic-congestion-limited LV3. The control of moving the travel position of the subject vehicle toward the side to which the lane change is to be performed may be performed by the offset control unit 132. That is, by the offset control, the travel position of the subject vehicle may be moved toward the side to which the lane change is to be performed.

The control execution unit 130 may have a configuration of performing other travel controls such as ACC (Adaptive Cruise Control). The ACC is a control realizing constant-speed travel of the subject vehicle at set vehicle speed or travel tracing the preceding vehicle.

The control execution unit 130 realizes the automated driving of LV2 or higher by executing both the ACC and the LTA control. The LCA control can be executed, for example, at the time of performing the ACC and the LTA control. The control execution unit 130 may realize the automated driving of LV1 by executing one of the ACC and the LTA control.

With the above-described configuration, in the subject vehicle, the automated driving of LV2 or lower and LV3 or higher can be executed. The automated driving ECU 10 may switch the autonomation level of the automated driving of the subject vehicle as necessary. As an example, when the subject vehicle moves from the MD area to the non-ST section in the AD area, it is sufficient to switch from the manual driving to the automated driving of LV2 or lower. When the subject vehicle moves from the MD area to the ST section in the AD area, it is sufficient to switch from the manual driving to the automated driving of LV3. When the subject vehicle moves from the non-ST section in the AD area to the ST section, it is sufficient to switch from the automated driving of LV2 or lower to the automated driving of LV3. When the subject vehicle moves from the ST section in the AD area to the non-ST section, it is sufficient to switch from the automated driving of LV3 to the automated driving of LV2 or lower. When the subject vehicle moves from the ST section in the AD area to the MD area, it is sufficient to switch from the automated driving of LV3 to the manual driving. When the subject vehicle moves from the non-ST section in the AD area to the MD area, it is sufficient to switch from the automatic driving of LV2 or lower to the manual driving.

The HCU communication unit 140 performs process of outputting information to the HCU 80 and process of obtaining information from the HCU 80. The HCU communication unit 140 sequentially outputs information of a surrounding recognition object recognized by the travel environment recognition unit 110, information regarding a behavior in the automated driving of the subject vehicle (hereinafter, behavior-related information), and the like together with operation information of the automated driving function to the HCU 80. Examples of the behavior-related information are as follows. During the LTA control, there is a planned travel path at the time of keeping the subject vehicle in the vehicle travel in the lane. During the offset control, there are the direction of offset and a planned travel path of the subject vehicle during the offset control. In the case of performing the LCA control, there are the direction of lane change and a planned travel path of the subject vehicle at the time of the lane change.

The HCU communication unit 140 has a presentation processing unit 141 as a sub function block. The presentation processing unit 141 indirectly controls indication in the display device 90, by outputting the above-described recognized-object information, the behavior-related information, and the like together with the operation information of the automated driving function toward the HCU 80, the presentation processing unit 141 makes the HCU 80 control display in the display device 90. Another configuration may be employed that, by also outputting an instruction for display to the HCU 80, the presentation processing unit 141 makes the display device 90 perform display via the HCU 80. Further another configuration may be employed that the HCU 80 makes the display device 90 perform display in accordance with a combination of output information without outputting an instruction for display. The presentation processing unit 141 corresponds to a display control unit.

The presentation processing unit 141 makes information related to the LTA control (hereinafter, LTA content) displayed during execution of the LTA control. The LTA content corresponds to lane-keep-related information. The LTA content includes a predicted path at the time of keeping in-lane travel (hereinafter, LTA predicted path), a mark indicating a lane in which the in-lane travel is to be kept (hereinafter, LTA mark), and an icon indicating a situation of the LTA control (hereinafter, LTA icon). For example, as the LTA content, at least an LTA predicted path, an LTA mark, and an LTA icon are displayed. As the LTA content, at least the LTA predicted path may be displayed. An example of the situation of the LTA control expressed by the LTA icon is a situation of whether the LTA control is being executed or not.

Figure 3:
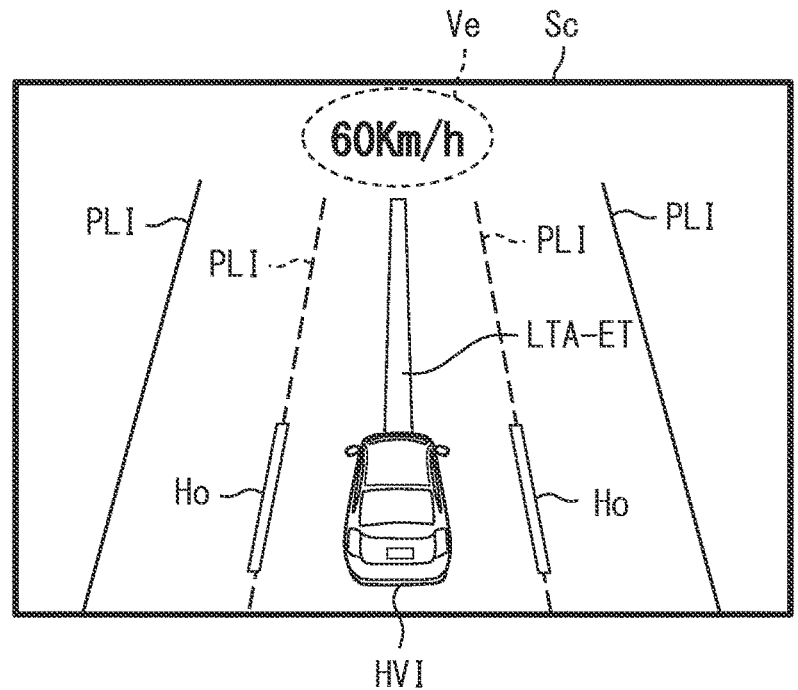
FIG. 3 is a diagram for explaining an example of display of LTA content in the case where offset control is not performed.

With reference to FIG. 3, an example of display of the LTA content in the case where the offset control is not being performed will be described. Sc indicates a display screen of the display device 90. PLI indicates an image expressing partition lines of a lane (hereinafter, partition line image). HVI indicates an image expressing the subject vehicle (hereinafter, subject vehicle image). Ho indicates an LTA mark. LTA-ET indicates the LTA predicted path. Ve indicates an image expressing the speed of the subject vehicle (hereinafter, vehicle speed image). In the following diagrams, the same reference characters indicate the same as above. A partition line image and an LTA mark may be displayed on the basis of the recognized-object information. The LTA predicted path and a vehicle speed image may be displayed on the basis of the behavior-related information.

As illustrated in FIG. 3, as the LTA predicted path, it is sufficient to display lines expressing a predicted path. The LTA predicted path does not always have to be expressed by solid lines but may be dotted lines, broken lines, or the like. It may have a shape of an arrow indicating a travel direction. In the example of FIG. 3, since the offset control is not being performed, the LTA predicted path is positioned in the center of the subject vehicle lane. As illustrated in FIG. 3, as LTA marks, it is sufficient to display marks emphasizing regions positioned on the right and left sides of the subject vehicle image in the partition line images. Although not illustrated in FIG. 3, an LTA icon may be displayed as LTA content.

Figure 4:
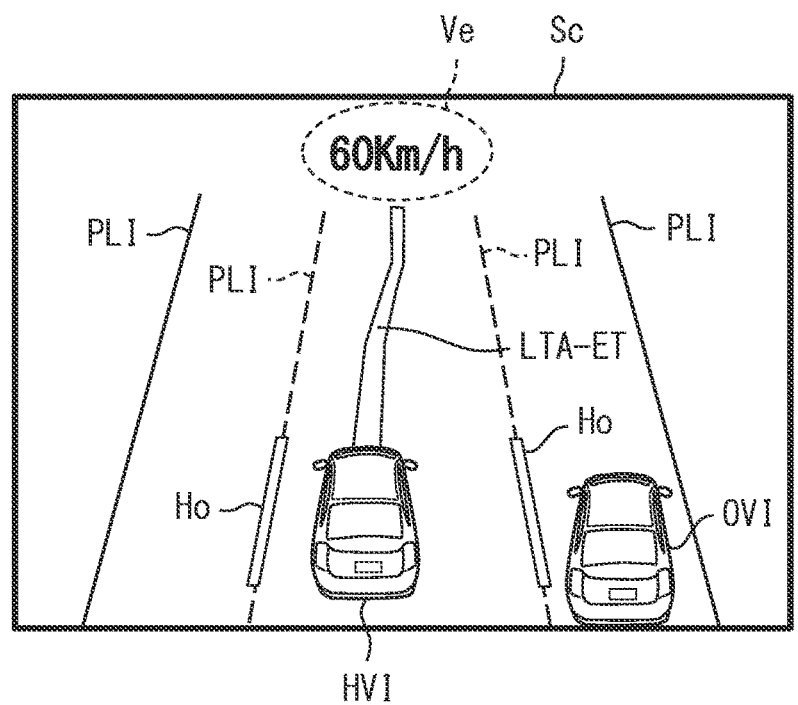
FIG. 4 is a diagram for explaining an example of display of LTA content in the case where the offset control is performed.

Subsequently, with reference to FIG. 4, an example of display of the LTA content in the case where the offset control is being executed will be described. OVI indicates an image expressing a vehicle around the subject vehicle (hereinbelow, surrounding vehicle image). In the example of FIG. 4, it is assumed that since a side-by-side traveling vehicle exists as the surrounding vehicle, the offset control is performed. During the offset control, the predicted path of the subject vehicle is deviated from the center of the subject vehicle lane only by the amount that the travel position of the subject vehicle is offset. The predicted path of the subject vehicle returns to the center of the subject vehicle lane from the point where the offset control finishes. Therefore, as illustrated in FIG. 4, the LTA predicted path is also displayed in a shape according to the offset by the offset control. The offset amount may be specified on the basis of the behavior-related information. The shape according to the offset by the offset control in the LTA predicted path corresponds to information related to the offset control (hereinafter, offset-related information). In the case of displaying also the LTA predicted path in a shape according to the offset by the offset control, it is sufficient to display an offset amount in an exaggerated manner so that offset is easily recognized. Although not illustrated also in FIG. 4, an LTA icon may be displayed as the LTA content. As described above, it is sufficient for the presentation processing unit 141 to display offset-related information in addition to the LTA content during execution of the LTA control and the offset control.

In the case of making the lane change performed by the LCA control unit 133, the presentation processing unit 141 displays information related to the lane change (hereinafter, LCA content). The LCA content corresponds to lane-change related information. As the LCA content, a predicted path at the time of performing the lane change (hereinafter, LCA predicted path), a mark indicating a lane change direction (hereinafter, LC direction mark), an icon indicating a situation of the LCA control (hereinafter, LCA icon), and the like can be mentioned. For example, as the LCA content, at least an LCA predicted path, an LC direction mark, and an LCA icon are displayed. As the LCA content, at least the LCA predicted path may be displayed. An example of the situation of the LCA control indicated by the LCA icon is a situation that the surrounding condition is satisfied and whether the lane change is prepared or not.

Figure 5:
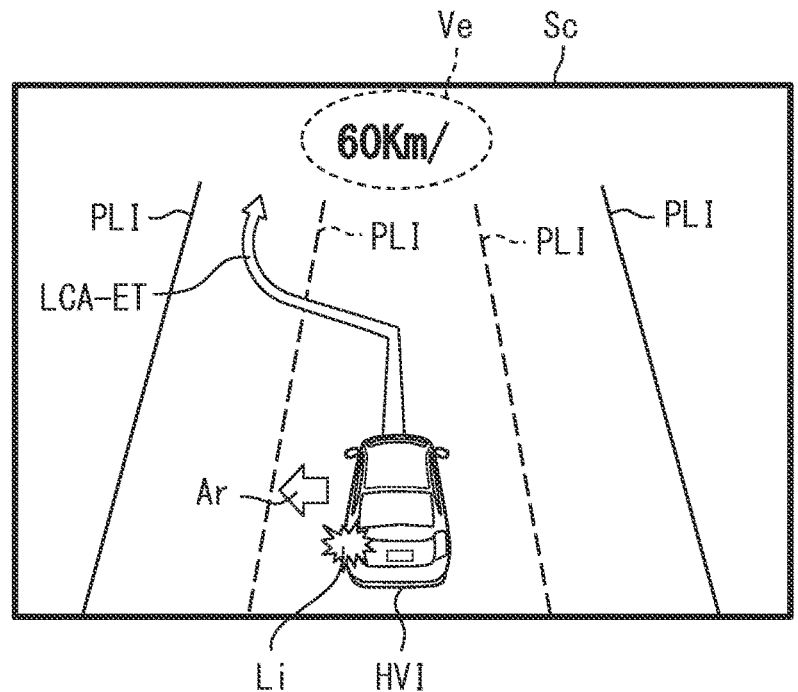
FIG. 5 is a diagram for explaining an example of display of LCA content in the case where offset control is not performed.

With reference to FIG. 5, an example of display of the LCA content in the case where the offset control is not being performed will be described. LCA-ET indicates the LCA predicted path. Ar and Li indicate LCA direction marks. As illustrated in FIG. 5, as the LCA predicted path, it is sufficient to display lines indicating a predicted path. The LCA predicted path does not always have to be solid lines but may be dotted lines, broken lines, or the like. The front end may have an arrow shape indicating the travel direction. As illustrated in FIG. 5, as the LCA mark, it is sufficient to display the arrow Ar indicating the direction of changing the lane. Alternatively, as the LCA mark, the turn signal lamp Li in the direction to which the lane is to be changed in the turn signal lamps in the image of the subject vehicle may emit light or blink. The LCA predicted path, the LCA direction mark, and the vehicle speed image may be displayed on the basis of the behavior-related information. Although not illustrated in FIG. 5, the LCA icon may be displayed as the LCA content. Display of the LCA content in the case where the offset control is being executed will be described later.

In the case of making the lane change performed by the LCA control unit 133 during execution of the LTA control, preferably, the presentation processing unit 141 changes the mode of display of the LTA content and, in addition, displays the LCA content. An example is as follows.

In the case of making the lane change performed by the LCA control unit 133 during execution of the LTA control and in the case where the LCA request by the system determination is received by the request receiving unit 122, preferably, the presentation processing unit 141 makes the LTA content undisplayed and, simultaneously or subsequently, displays the LCA content. Also in the case of making the LTA content undisplayed and, subsequently, displaying the LCA content, preferably, an interval is not provided to an extent that it can be substantially said as the same time, by the above, the occupant recognizes the switching from the LTA control to the LCA control more easily.

On the other hand, in the case of making the lane change performed by the LCA control unit 133 during the LTA control, and in the case of receiving the LCA request by an occupant input by the request receiving unit 122, preferably, the presentation processing unit 141 displays the LCA content without waiting until the LTA content is made undisplayed. Even when the LCA request is received by the request receiving unit 122, there is the case that the LTA control is not started immediately depending on the surrounding situation. In this case, when display of the LCA content does not start despite of the input, the occupant who inputted the LCA request may feel discomfort. Consequently, by displaying the LCA content without waiting that the LTA content is made undisplayed, occurrence of the feeling of discomfort can be suppressed.

In the case of displaying the LCA content without waiting that the LTA content is made undisplayed, the LTA content and the LCA content may be displayed in a superimposed manner, or the LTA content and the LCA content may be combined and displayed. In the case of combining the LTA content and the LCA content and displaying the resultant, the LTA content and the LCA content may be partially combine. For example, since it is troublesome to display both of the LTA predicted path and the LTA predicted path in a superimposed manner, preferably, the LTA predicted path and the LTA predicted path are combined as one path. Hereinafter, a path obtained by combining the LTA predicted path and the LTA predicted path will be called a combined path.

In the case of displaying the LCA content without waiting until the LTA content is made undisplayed, preferably, the presentation processing unit 141 also displays the LTA content indicating that the LTA control is being continued. Examples of the LTA content indicating that the LTA control is being continued are LTA content displayed so as to be superimposed with the above-described LCA content and LTA content combined with the LCA content.

In the case of making the lane change performed by the LCA control unit 133 during execution of the LTA control and the offset control, preferably, the presentation processing unit 141 displays the LCA content without waiting that the LTA content and the offset-related information is made undisplayed, and displays the LTA content and the offset-related information in a mode indicating that the lane change is performed from a state where the offset control is being executed, by the above, even in the case of making the lane change performed by the LCA control unit 133 during execution of the LTA control and the offset control, switching of the control can be easily understood by the occupant.

Figure 6:
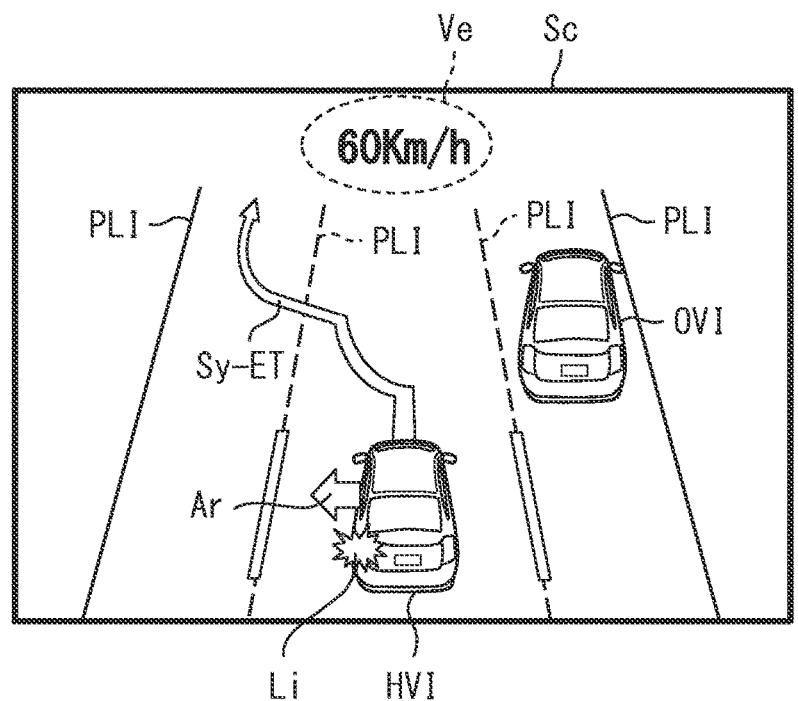
FIG. 6 is a diagram for explaining an example of display of LCA content in the case where the offset control is performed.

As an example, as illustrated in FIG. 6, a combined path obtained by combining the LTA predicted path and the LCA predicted path in a shape fitted to the offset performed by the offset control is displayed. Sy-ET in FIG. 6 indicates a composite path. In the composite path, the first-half part is a part of the LTA predicted path of the shape fitted to the offset by the offset control and the latter-half part is a part of the LCA predicted path. Although not illustrated also in FIG. 6, the LCA icon may be displayed as the LCA content.

Although the configuration that the presentation processing unit 141 makes the display device 90 perform display via the HCU 80 has been described above, the present disclosure is not always limited to the configuration. For example, a configuration that the presentation processing unit 141 directly controls the display device 90 to perform display may be also employed. Another configuration may be also employed that the HCU 80 making the display device 90 perform display on the basis of information obtained from the presentation processing unit 141 corresponds to a display control unit. In this case, a unit including the automated driving ECU 10 and the HCU 80 corresponds to a control device for a vehicle.

<LCA-Related Process in Automated Driving ECU 10>

Figure 7:
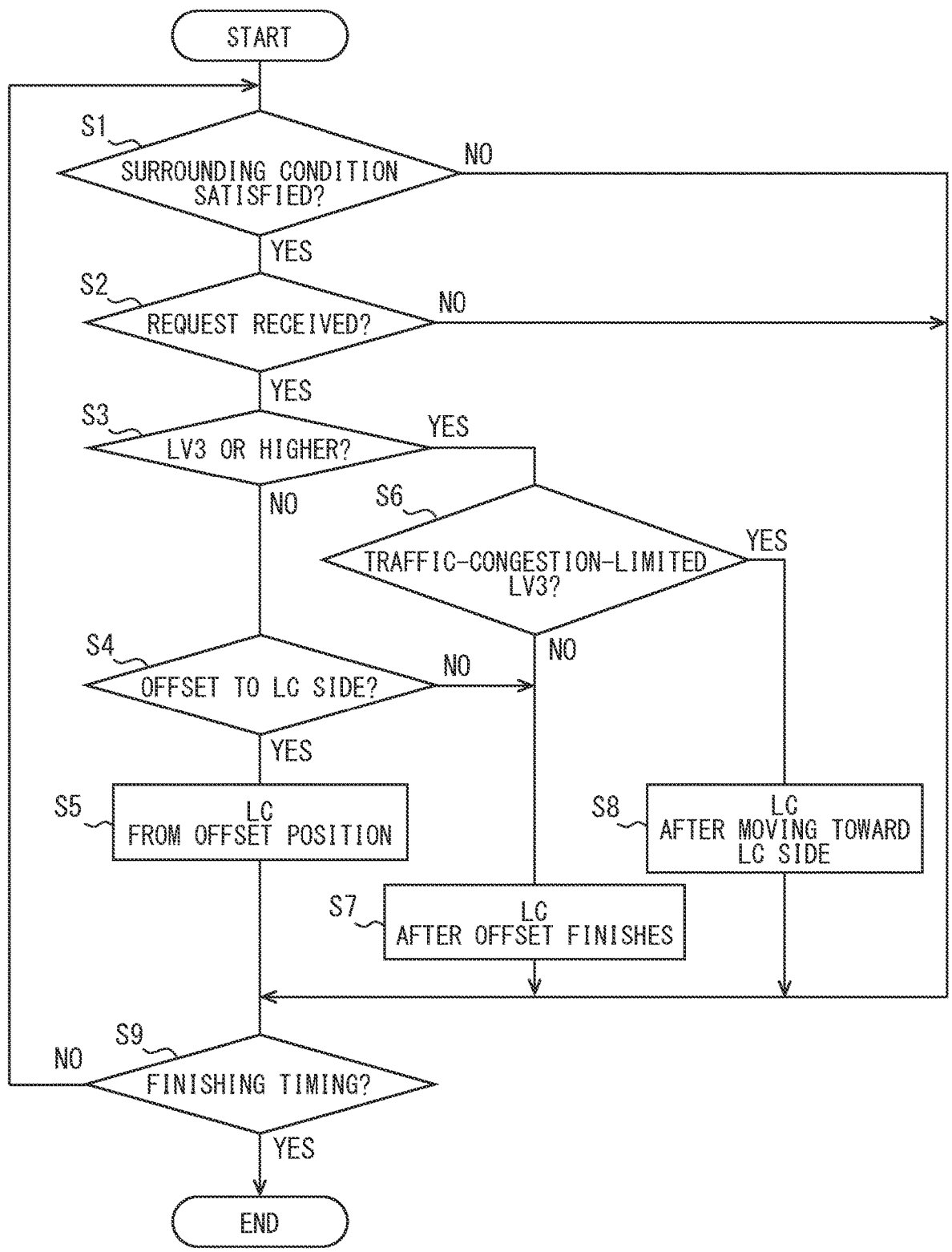
FIG. 7 is a flowchart illustrating an example of the flow of LCA-related process in the automated driving ECU.

Referring to the flowchart of FIG. 7, an example of the flow of processes related to a lane change (hereinafter, LCA-related process) during execution of the LTA control and the offset control in the automated driving ECU 10 will be described. It is sufficient to start the flowchart of FIG. 7 in the case where, for example, the autonomation level of the subject vehicle becomes LV2 or higher. The autonomation level may be specified by the level specifying unit 121.

First, in step S1, the LCA control unit 133 determines whether the surrounding condition is satisfied or not. The LCA control unit 133 may determine whether the surrounding condition is satisfied nor not from a result of recognition of the travel environment by the travel environment recognition unit 110. For example, when a neighboring vehicle whose relative speed to the subject vehicle is equal to or higher than a threshold does not exist within a predetermined distance from the sides and the rear side of the subject vehicle, it may be determined that the surrounding condition is satisfied. The threshold may be, for example, zero or a relatively small positive value. When the surrounding condition is satisfied (YES in S1), the program moves to step S2. On the other hand, when the surrounding condition is not satisfied (NO in S1), the program moves to step S9. When the surrounding condition is satisfied, it is sufficient to display, for example, the LCA icon indicating that preparation for a lane change is completed.

In step S2, when the LCA request is received by the request receiving unit 122 (YES in S2), the program moves to step S3. On the other hand, when the LCA request is not received by the request receiving unit 122 (NO in S2), the program moves to step S9. The LCA request by an occupant input among LCA requests is made as necessary by an occupant who recognizes that the preparation for a lane change is completed by the LCA icon.

In step S3, when the automation level of the subject vehicle is LV3 or higher (YES in S3), the program moves to step S6. On the other hand, when the automation level of the vehicle is LV2 (NO in S3), the program moves to step S4. The autonomation level may be specified by the level specifying unit 121.

In step S4, when the subject vehicle is offset to the side to which the lane change is to be performed (hereinafter, LC side) by the offset control (YES in S4), the program moves to step S5. On the other hand, in the case where the vehicle is offset to the side opposite to the LC side by the offset control (NO in S4), the program moves to step S7.

In step S5, the adjusting unit 134 makes the lane change performed by the LCA control unit 133 from the offset position which has been offset by the offset control, and the program moves to step S9. In FIG. 7, the lane change is described as LC. The LCA control unit 133 determines again whether the surrounding condition is satisfied or not and, when the surrounding condition is satisfied, may start the lane change. When the surrounding condition is not satisfied, it is sufficient to wait until the surrounding condition is satisfied and then start the lane change. This is because there is also a case that, even when the LCA request is received, a state that the surrounding condition is satisfied is not continued.

In step S6, when the automation level of the subject vehicle is the traffic-congestion-limited LV3 (YES in S6), the program moves to step S8. On the other hand, when the automation level of the subject vehicle is not the traffic-congestion-limited LV3 (NO in S6), the program moves to step S7.

In step S7, the adjusting unit 134 finishes the offset control, moves the subject vehicle to the center of the subject vehicle lane and, subsequently, makes the lane change performed by the LCA control unit 133. Subsequently, the program moves to step S9. Also in S7, in a manner similar to S5, the LCA control unit 133 determines again whether the surrounding condition is satisfied or not and, when the surrounding condition is satisfied, starts the lane change.

In step S8, the adjusting unit 134 moves the travel position of the subject vehicle to the side to which the lane change is performed regardless of the direction of offset performed by the offset control and, subsequently, makes the lane change performed by the LCA control unit 133. Subsequently, the program moves to S9. Also in S8, in a manner similar to S5, the LCA control unit 133 determines again whether the surrounding condition is satisfied or not and, when the surrounding condition is satisfied, starts the lane change.

In step S9, in the case of the timing of finishing the LCA-related process (YES in S9), the LCA-related process is finished. On the other hand, in the case where it is not the timing of finishing the LCA-related process (NO in S9), the program returns to S1 and repeats the process. An example of the LCA-related process finishing timing is a timing the automation level of the subject vehicle becomes LV1 or lower, a timing the power switch of the subject vehicle is turned off, or the like. The power switch refers to a switch for starting the internal combustion engine or the motor generator of the subject vehicle.

Although the configuration that the process in the adjusting unit 134 switches according to whether the automation level of the subject vehicle is the traffic-congestion-limited LV3 or not has been described in the first embodiment, the present disclosure is not always limited to the configuration. For example, in the case of the automated driving without monitoring obligation of LV3 or higher regardless that the level is the traffic-congestion-limited LV3 or not, a configuration may be employed that the adjusting unit 134 finishes the offset control, moves the subject vehicle to the center of the host-vehicle's lane and, subsequently, makes the lane change performed by the LCA control unit 133.

Although the configuration that the process in the adjusting unit 134 switches according to whether the automation level of the subject vehicle is LV3 or higher or not has been described in the first embodiment, the present disclosure is not always limited to the configuration. For example, regardless that the automation level of the subject vehicle is LV3 or higher or not, in a manner similar to the case of LV2, the process in the adjusting unit 134 may be switched according to the direction of the offset.

Summary of First Embodiment

According to the configuration of the first embodiment, in the case of performing a lane change during execution of an LTA control and an offset control and in the case where the travel position of the subject vehicle has been offset to a side opposite to a side to which the lane change is to be performed, the offset control is finished and the subject vehicle is moved to the center of a lane of the subject vehicle. Consequently, the occupant easily notices that, after the offset control is finished, the lane change is performed. As a result, with respect to a lane change in the case where the offset control is performed at the time of the automated driving including lane keeping, decrease in the convenience can be prevented and anxiety of the occupant can be lessened.

According to the configuration of the first embodiment, in the case of performing a lane change during execution of the LTA control and an offset control and in the case where the travel position of the subject vehicle has been offset to a side to which the lane change is to be performed, the lane change is performed from an offset position which has been offset by the offset control. It enables smooth shift from the offset control state to the lane change. As a result, the lane change in the case where the offset control is performed at the time of automated driving including lane keeping can be performed more smoothly. In the case where the travel position of the subject vehicle has been offset to the side to which the lane change is to be performed, when the offset control is finished and the subject vehicle is moved to the center of the subject vehicle lane, there is a case that a sense of discomfort due to unsmooth shift to the lane change exceeds reduction of a sense of discomfort realized by making the control easily understood. It is therefore preferable to reduce the sense of discomfort by smoothly performing the lane change.

As described above, according to the configuration of the first embodiment, reduction of anxiety of an occupant while preventing deterioration in convenience and more smooth execution of the lane change can be properly performed as necessary.

Second Embodiment

The present disclosure is not limited to the configuration described in the first embodiment and may also employ the configuration of a second embodiment described hereinafter. In the following, an example of the second embodiment will be described with reference to the drawings. The system 1 for a vehicle of the second embodiment is similar to the system 1 for a vehicle of the first embodiment except for the point that the automated driving ECU 10a is included instead of the automated driving ECU 10.

Figure 8:
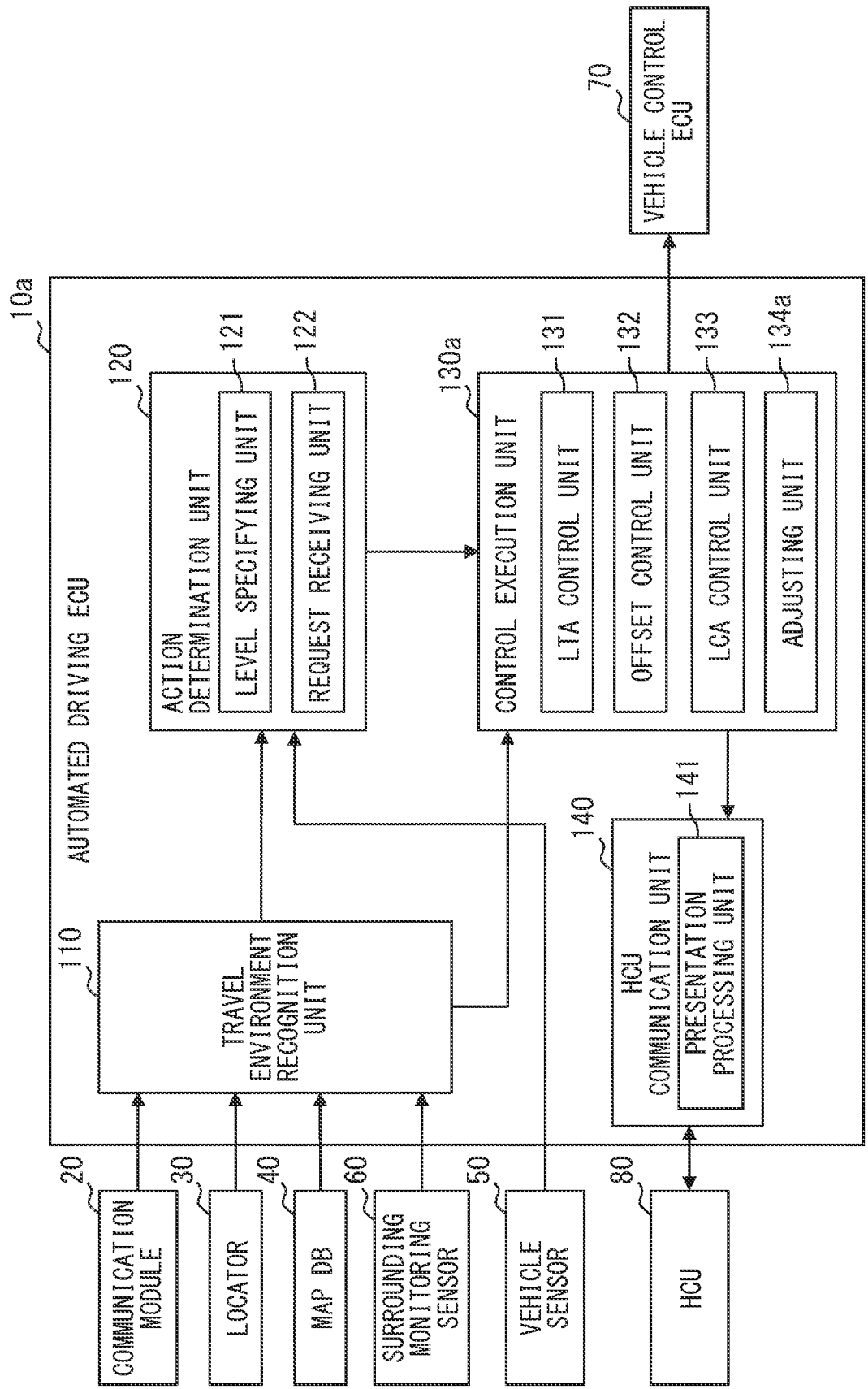
FIG. 8 is a diagram illustrating an example of a schematic configuration of an automated driving ECU.

First, a schematic configuration of the automated driving ECU 10a will be described with reference to FIG. 8. As illustrated in FIG. 8, the automated driving ECU 10a has, as functional blocks, the travel environment recognition unit 110, the action determination unit 120, a control execution unit 130a, and the HCU communication unit 140. The automated driving ECU 10a is similar to the automated driving ECU 10 of the first embodiment except for the point that the control execution unit 130a is provided instead of the control execution unit 130. The automated driving ECU 10a also corresponds to a control device for a vehicle. Execution of processes of the function blocks of the automated driving ECU 10a by a computer corresponds to execution of a control method for a vehicle.

The control execution unit 130a has the LTA control unit 131, the offset control unit 132, the LCA control unit 133, and an adjusting unit 134a as sub function blocks. The control execution unit 130a is similar to the control execution unit 130 of the first embodiment except for the point that an adjusting unit 134a is provided instead of the adjusting unit 134. The process in the adjusting unit 134a also corresponds to the adjusting process.

In the case of making the lane change performed by the LCA control unit 133 during execution of the LTA control and the offset control, depending on whether a lane change after passing another vehicle in an adjacent lane (hereinafter, after-passing lane change) or a lane change after another vehicle in an adjacent lane overtakes the subject vehicle (hereinafter, after-overtaken lane change), the adjusting unit 134a switches between a lane change performed after the offset control is finished and the subject vehicle is moved to the center of the subject vehicle lane and a lane change performed from the travel position of the subject vehicle which has been offset by the offset control (that is, the offset position).

In the case of making the "after-passing lane change" performed by the LCA control unit 133 during execution of the LTA control and the offset control, preferably, the adjusting unit 134a finishes the offset control, moves the subject vehicle to the center of the subject vehicles lane and, subsequently, makes the "after-passing lane change" performed by the LCA control unit 133. In the case of performing the "after-passing lane change", high acceleration is necessary. On the other hand, since the offset control is finished and then the subject vehicle is moved to the center of the subject vehicle lane, high acceleration necessary for the "after-passing lane change" is easily performed. In addition, for an occupant, it is more easily understood that, after the offset control is finished, the lane change is performed.

On the other hand, in the case of making the "after-overtaken lane change" performed by the LCA control unit 133 during execution of the LTA control and the offset control, preferably, the adjusting unit 134a makes the "after-overtaken lane change" performed by the LCA control unit 133 from the offset position which has been offset by the offset control. The reason is that priority may be placed on the smoother lane change since high acceleration is unnecessary in the case of performing the "after-overtaken lane change". It is similarly applied to the case of a lane change which is neither the "after-passing lane change" nor the "after-overtaken lane change" (hereinafter, lane change without a side-by-side travelling vehicle). Therefore, also in the case of the lane change without a side-by-side travelling vehicle, it is sufficient to make a lane change performed by the LCA control unit 133 from the offset position which has been offset by the offset control.

Subsequently, with reference to the flowchart of FIG. 9, an example of the flow of the LCA-related process in the automated driving ECU 10a will be described. The flowchart of FIG. 9 may be also started, for example, when the autonomation level of the subject vehicle becomes LV2 or higher.

First, in step S21, in a manner similar to S1, the LCA control unit 133 determines whether the surrounding condition is satisfied or not. When the surrounding condition is satisfied (YES in S21), the program moves to step S22. On the other hand, when the surrounding condition is not satisfied (NO in S21), the program moves to step S26.

In step S22, process is performed in a manner similar to S2. In S22, when the LCA request is received by the request receiving unit 122 (YES in S22), the program moves to step S23. On the other hand, when the LCA request is not received by the request receiving unit 122 (NO in S22), the program moves to step S26.

In step S23, in the case where the lane change to be performed by the LCA control unit 133 is the "after-passing lane change" (YES in S23), the program moves to step S24. On the other hand, in the case where the lane change to be performed by the LCA control unit 133 is not the "after-passing lane change" (NO in S23), the program moves to step S25. The case where it is not the "after-passing lane change" is the case of the "after-overtaken lane change" or "lane change without a side-by-side travelling vehicle".

In step S24, the adjusting unit 134a finishes the offset control, moves the subject vehicle to the center of the subject vehicle lane and, subsequently, makes the lane change performed by the LCA control unit 133. Subsequently, the program moves to step S26. Also in S24, in a manner similar to S5, the LCA control unit 133 determines again whether the surrounding condition is satisfied or not and, when the surrounding condition is satisfied, starts the lane change.

On the other hand, in step S25, the adjusting unit 134a makes the lane change performed by the LCA control unit 133 from the offset position which has been offset by the offset control, and the program moves to step S26. Also in S25, in a manner similar to S5, the LCA control unit 133 determines again whether the surrounding condition is satisfied or not and, when the surrounding condition is satisfied, starts the lane change.

In step S26, when it is the timing of finishing the LCA-related process (YES in S26), the LCA-related process is finished. On the other hand, in the case where it is not the timing of finishing the LCA-related process (NO in S26), the program returns to S21 and repeats the process.

Figure 9:
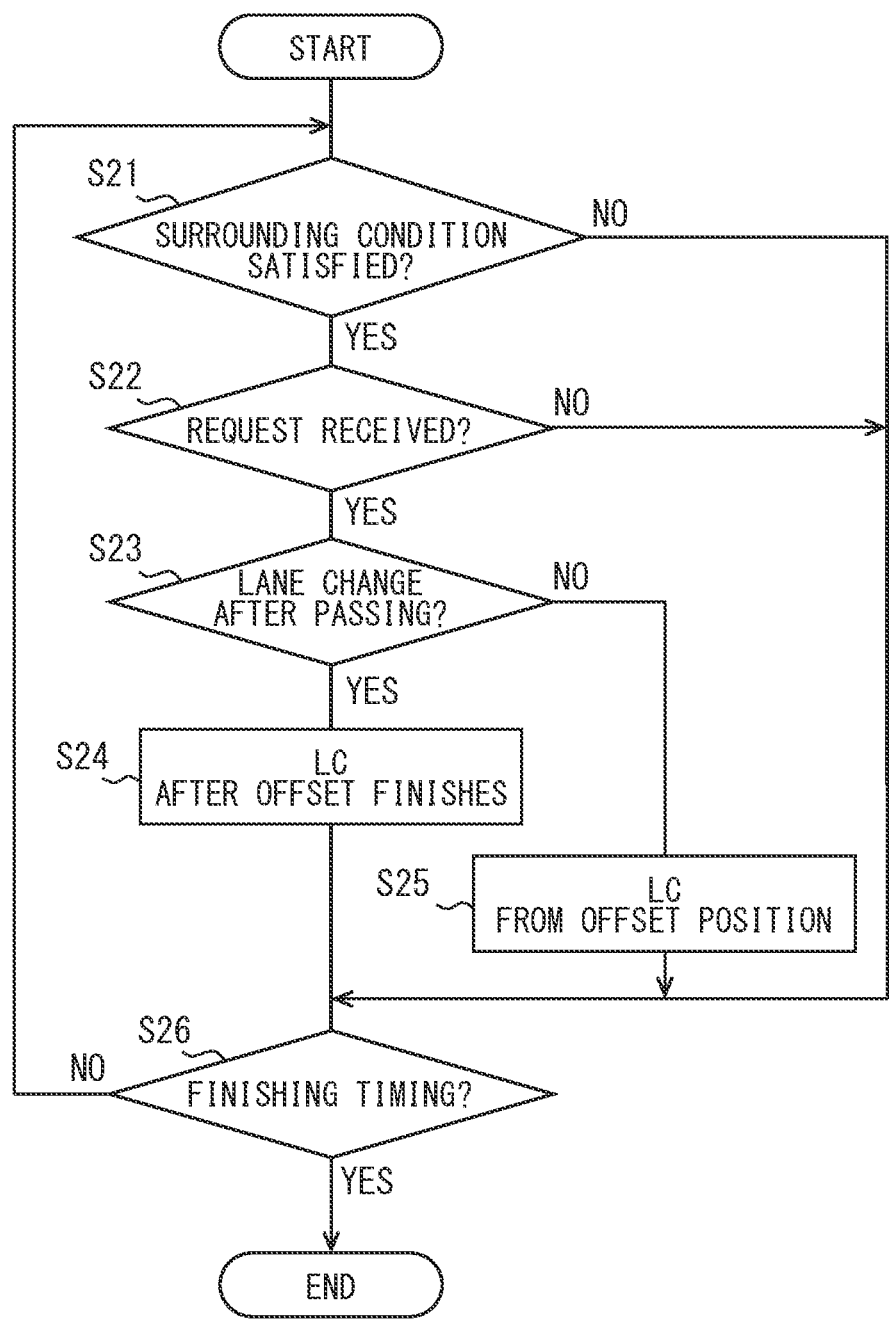
FIG. 9 is a flowchart illustrating an example of the flow of LCA-related process in the automated driving ECU.

The process as described in FIG. 9 may be limited to the case where the automation level is LV2 and, in the case of LV3 or higher, process may be performed in a manner similar to the process of the case of LV3 or higher in the first embodiment. In the case of making the "after-overtaken lane change" performed by the LCA control unit 133 during execution of the LTA control and the offset control, the adjusting unit 134a may switch the process in accordance with the direction of offset made by the offset control. For example, in the case of offset made by the offset control to the side to which the lane change is to be performed, the "after-overtaken lane change" may be performed by the LCA control unit 133 from the offset position. On the other hand, in the case of offset made by the offset control in a direction that is opposite to a direction in which the lane change is to be performed, it is sufficient to finish the offset control, move the subject vehicle to the center of the subject vehicle lane and, subsequently, make the "after-overtaken lane change" performed by the LCA control unit 133.

Also by the configuration of the second embodiment, deterioration in convenience is prevented, and reduction of the anxiety of an occupant and smooth lane change can be appropriately performed according to necessity in each of the "after-passing lane change" and the "after-overtaken lane change".

Third Embodiment

In the first and second embodiment, the configuration that, in the case of executing the lane change during execution of the LTA control and the offset control, the process of finishing the offset control, moving the subject vehicle to the center of the subject vehicle lane and, subsequently, making the lane change performed, and the process of making the lane change performed from the offset position can be switched has been described. However, the present disclosure is not limited to the configuration. For example, a configuration that, in those processes, only the process of finishing the offset control, moving the subject vehicle to the center of the subject vehicle lane and, subsequently, making the lane change performed can be performed (hereinafter, a third embodiment) may be employed.

In the following, an example of the third embodiment will be described with reference to the drawings. The system 1 for a vehicle of the third embodiment is similar to the system 1 for a vehicle of the first embodiment except for the point that an automated driving ECU 10b is included instead of the automated driving ECU 10.

Figure 10:
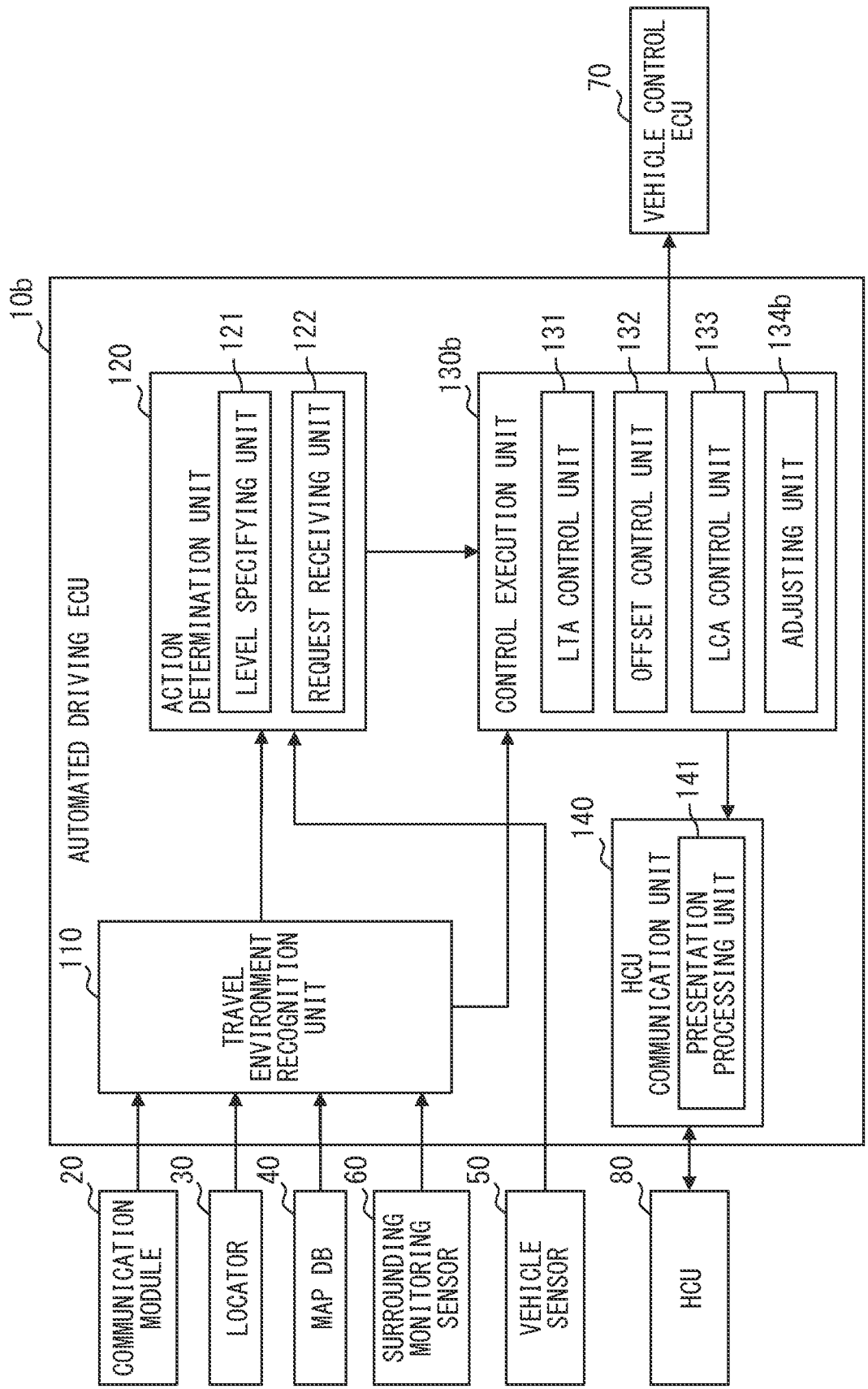
FIG. 10 is a diagram illustrating an example of a schematic configuration of the automated driving ECU.

A schematic configuration of the automated driving ECU 10b will be described with reference to FIG. 10. As illustrated in FIG. 10, the automated driving ECU 10b has, as functional blocks, the travel environment recognition unit 110, the action determination unit 120, a control execution unit 130b, and the HCU communication unit 140. The automated driving ECU 10b is similar to the automated driving ECU 10 of the first embodiment except for the point that the control execution unit 130b is provided instead of the control execution unit 130. The automated driving ECU 10b also corresponds to a control device for a vehicle. Execution of processes of the function blocks of the automated driving ECU 10b by a computer corresponds to execution of a control method for a vehicle.

The control execution unit 130b has the LTA control unit 131, the offset control unit 132, the LCA control unit 133, and an adjusting unit 134b as sub function blocks. The control execution unit 130b is similar to the control execution unit 130 of the first embodiment except for the point that the adjusting unit 134b is provided instead of the adjusting unit 134. The process in the adjusting unit 134b also corresponds to the adjusting process.

The adjusting unit 134b is similar to the adjusting units 134 and 134a of the first and second embodiments except for the point that, in the case of making the lane change performed is not performed from the offset position, in the case of making the lane change performed during execution of the LTA control and the offset control. In the case of making the lane change performed during execution of the LTA control and the offset control, the adjusting unit 134b finishes the offset control, moves the subject vehicle to the center of the subject vehicle lane, subsequently, makes the lane change performed by the LCA control unit 133.

Also by the configuration of the third embodiment, the occupant easily notices that after finishing the offset control, the lane change is performed. As a result, with respect to a lane change in the case where the offset control is performed at the time of the automated driving including lane keeping, decrease in the convenience can be prevented and anxiety of the occupant can be lessened.

Fourth Embodiment

In the first and second embodiment, the configuration that, in the case of executing the lane change during execution of the LTA control and the offset control, the process of finishing the offset control, moving the subject vehicle to the center of the subject vehicle lane and, subsequently, making the lane change performed, and the process of making the lane change performed from the offset position can be switched has been described. However, the present disclosure is not limited to the configuration. For example, a configuration that, among those processes, only the process of making the lane change performed from the offset position can be performed (hereinafter, a fourth embodiment) may be employed.

In the following, an example of the fourth embodiment will be described with reference to the drawings. The system 1 for a vehicle of the fourth embodiment is similar to the system 1 for a vehicle of the first embodiment except for the point that an automated driving ECU 10c is included instead of the automated driving ECU 10.

Figure 11:
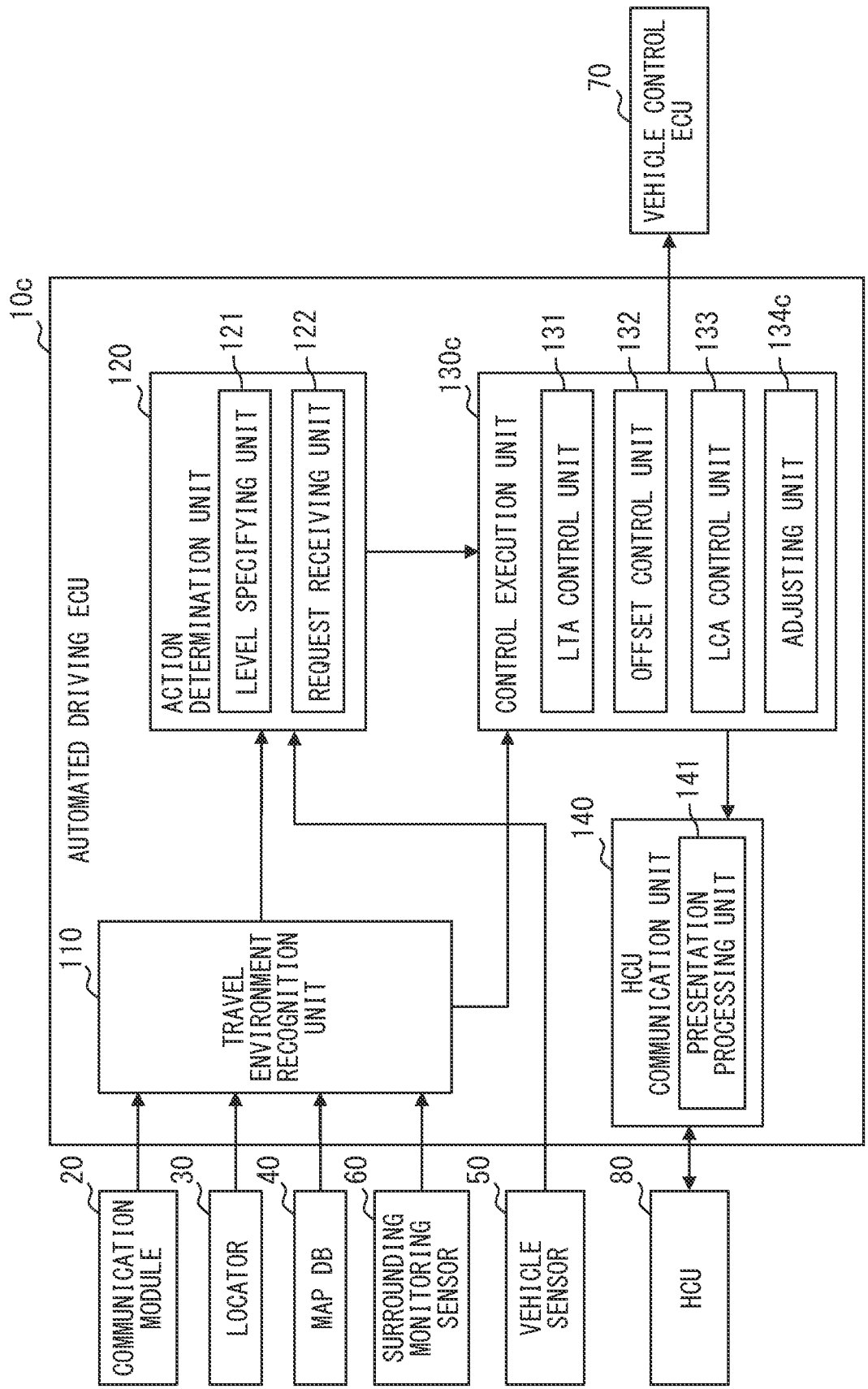
FIG. 11 is a diagram illustrating an example of a schematic configuration of the automated driving ECU.

A schematic configuration of the automated driving ECU 10c will be described with reference to FIG. 11. As illustrated in FIG. 11, the automated driving ECU 10c has, as functional blocks, the travel environment recognition unit 110, the action determination unit 120, a control execution unit 130c, and the HCU communication unit 140. The automated driving ECU 10c is similar to the automated driving ECU 10 of the first embodiment except for the point that the control execution unit 130c is provided instead of the control execution unit 130. The automated driving ECU 10c also corresponds to a control device for a vehicle. Execution of processes of the function blocks of the automated driving ECU 10c by a computer corresponds to execution of a control method for a vehicle.

The control execution unit 130c has the LTA control unit 131, the offset control unit 132, the LCA control unit 133, and an adjusting unit 134c as sub function blocks. The control execution unit 130c is similar to that control execution unit 130 of the first embodiment except for the point that the adjusting unit 134c is provided instead of the adjusting unit 134. The process in the adjusting unit 134c also corresponds to the adjusting process.

The adjusting unit 134c is similar to the adjusting units 134 and 134a of the first and second embodiments except for the point that, in the case of making the lane change performed during execution of the LTA control and the offset control, the process of finishing the offset control, moving the subject vehicle to the center of the subject vehicle lane and, subsequently, making the lane change performed is not performed. In the case of making the lane change performed during execution of the LTA control and the offset control, the adjusting unit 134c makes the lane change performed by the LCA control unit 133 from the offset position.

Also by the configuration of the fourth embodiment, smooth shift from the offset control state to the lane change can be realized. As a result, the lane change in the case where the offset control is performed at the time of automated driving including lane keeping can be performed more smoothly.

Fifth Embodiment

Although the configuration of switching the display mode of LTA content in the case of making the lane change performed during execution of the LTA control according to which one of the LCA request by an occupant input and the LCA request by system determination is received by the request receiving unit 122 has been described in the foregoing embodiments, the present disclosure is not always limited to the configuration. For example, a configuration that the display mode of the LTA content in the case of making the lane change performed during execution of the LTA control is not switched (hereinafter, a fifth embodiment) may be employed.

In this case, in the case of making the lane change performed by the LCA control unit 133 during execution of the LTA control, the presentation processing unit 141 may display the LCA content at the same time the LTA content is made undisplayed or after the LTA content is made undisplayed.

Another configuration may be employed such that, in the case of making the lane change performed by the LCA control unit 133 during execution of the LTA control, the presentation processing unit 141 displays the LCA content without waiting that the LTA content is made undisplayed.

The present disclosure is not limited to the foregoing embodiments but can be variously changed within the scope of claims. An embodiment obtained by properly combining the technical means disclosed in the different embodiments is also included in the technical scope of the present disclosure. The control unit and its methods described in the present disclosure may be realized by a dedicated computer as a component of a processor programmed to execute one or plural functions embodied by a computer program. Alternatively, each of the devices and method described in the present disclosure may be realized by a dedicated hardware logic circuit. Alternatively, each of the devices and method described in the present disclosure may be realized by one or more dedicates computers each configured by a processor executing a computer program and one or more hardware logic circuits. The computer program may be stored as computer-executable instructions in a computer-readable non-transitory tangible storage medium.

What is claimed is:

1. A control device for a vehicle, the vehicle capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle, the control device comprising:
   a controller configured to automatically perform lane change; and
   when the lane change is performed during the lane keep control and the offset control,
      finish the offset control and move the vehicle to a center of a travel lane of the vehicle and
      subsequently cause the performance of the lane change, wherein
   the controller is configured to,
   when the lane change is performed during the lane keep control and the offset control and
   when the travel position of the vehicle has been offset by the offset control in a direction in which the lane change is to be performed,
      cause the performance of the lane change from the travel position of the vehicle, which has been offset by the offset control, and
   the controller is configured to,
   when the lane change is performed during the lane keep control and the offset control and
   when the travel position of the vehicle has been offset by the offset control in a direction that is opposite to a direction in which the lane change is to be performed,
      finish the offset control and move the vehicle to the center of the travel lane of the vehicle and
      subsequently cause the performance of the lane change.

2. A control device for a vehicle, the vehicle capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle, the control device comprising:
   a controller configured to automatically perform lane change; and
   when the lane change is performed during the lane keep control and the offset control,
      cause the performance of the lane change from the travel position of the vehicle, which has been offset by the offset control, wherein
   the controller is configured to,
   when the lane change is performed during the lane keep control and the offset control and when the travel position of the vehicle has been offset by the offset control in a direction in which the lane change is to be performed,
cause the performance of the lane change from the travel position of the vehicle, which has been offset by the offset control, and
the controller is configured to,
when the lane change is performed during the lane keep control and the offset control and
when the travel position of the vehicle has been offset by the offset control in a direction that is opposite to a direction in which the lane change is to be performed,
finish the offset control and move the vehicle to the center of the travel lane of the vehicle and
subsequently cause the performance of the lane change.

3. The control device for a vehicle according to claim 1, further comprising:
a request receiver configured to receive a request for the lane change, wherein
the controller is configured to,
when the lane change is performed during the lane keep control and the offset control,
when the travel position of the vehicle has been offset by the offset control in a direction that is opposite to a direction in which the lane change is to be performed, and
even when the request receiver receives the request for the lane change,
finish the offset control and move the vehicle to the center of the travel lane of the vehicle and
subsequently cause the performance of the lane change.

4. The control device for a vehicle according to claim 1, wherein
the vehicle is capable of performing, as the automated driving, an automated driving without monitoring obligation that requires no monitoring obligation of a driver of the vehicle,
the controller is configured to,
when the lane change is performed during the automated driving without the monitoring obligation and during the lane keep control and the offset control,
regardless of whether the travel position of the vehicle has been offset by the offset control in a direction in which the lane change is to be performed or the travel position of the vehicle has been offset in a direction that is opposite to the direction in which the lane change is to be performed,
finish the offset control and move the vehicle to the center of the travel lane of the vehicle and
subsequently cause the performance of the lane change.

5. The control device for a vehicle according to claim 1, wherein
the controller is configured to,
when the lane change is performed during the lane keep control and the offset control,
depending on an after-passing lane change, which is the lane change after the vehicle passes an other vehicle in an adjacent lane, or an after-overtaken lane change, which is the lane change after the vehicle is overtaken by an other vehicle in the adjacent lane,
switch between
the lane change to be performed after finishing the offset control and moving the vehicle to the center of the travel lane of the vehicle and
the lane change to be performed from the travel position of the vehicle, which has been offset by the offset control.

6. The control device for a vehicle according to claim 5, wherein
the controller is configured to,
when the after-passing lane change is performed during the lane keep control and the offset control,
finish the offset control and move the vehicle to the center of the travel lane of the vehicle and
subsequently cause the performance of the after-passing lane change.

7. The control device for a vehicle according to claim 5, wherein
the controller is configured to,
when the after-overtaken lane change is performed during the lane keep control and the offset control,
cause the performance of the after-overtaken lane change from the travel position of the vehicle, which has been offset by the offset control.

8. The control device for a vehicle according to claim 1, wherein
the vehicle is capable of performing, as the automated driving, a traffic-congestion-limited automated driving without monitoring obligation of a driver of the vehicle only in a traffic congestion time, and
the controller is configured to,
when the lane change is performed during the traffic-congestion-limited automated driving and during the lane keep control and the offset control,
regardless of whether the travel position of the vehicle has been offset by the offset control in a direction in which the lane change is to be performed or the travel position of the vehicle has been offset in a direction that is opposite to the direction in which the lane change is to be performed,
move the travel position of the vehicle in the direction in which the lane change is to be performed and
subsequently cause the performance of the lane change.

9. The control device for a vehicle according to claim 1, further comprising:
a display controller configured to control a display device for the vehicle, wherein
the display controller is configured to, during the lane keep control,
cause the display device to display lane-keep-related information as information related to the lane keep control, and
the display controller is configured to, when the lane change is performed during the lane keep control, cause the display device to
change a mode of display of the lane-keep-related information and
display lane-change-related information as information related to the lane change.

10. The control device for a vehicle according to claim 9, wherein
the display controller is configured to,
when the lane change is performed during the lane keep control,
cause the display device not to display the lane-keep-related information and
cause the display device to display the lane-change-related information, simultaneously or after causing the display device not to display the lane-keep-related information.

11. The control device for a vehicle according to claim 9, wherein
the display controller is configured to,
when the lane change is performed during the lane keep control,
cause the display device to display the lane-change-related information, without waiting until the display device is caused not to display the lane-keep-related information.

12. The control device for a vehicle according to claim 9, further comprising:
a request receiver configured to receive a request for the lane change, wherein
the request receiver is configured to receive the request for the lane change, which is made by any of input from an occupant of the vehicle and determination by a system of the vehicle, and
the display controller is configured to,
when the lane change is performed during the lane keep control and
when the request receiver receives the request for the lane change, which is made on determination by the system of the vehicle,
cause the display device not to display the lane-keep-related information and
cause the display device to display the lane-change-related information, simultaneously or after causing the display device not to display the lane-keep-related information, and
the display controller is configured to,
when the lane change is performed during the lane keep control and
when the request receiver receives the request for the lane change, which is made by input from an occupant of the vehicle,
cause the display device to display the lane-change-related information, without waiting until the display device is caused not to display the lane-keep-related information.

13. The control device for a vehicle according to claim 11, wherein
the display controller is configured to,
when the display controller causes the display device to display the lane-change-related information, without waiting until the display device is caused not to display the lane-keep-related information,
further display the lane-keep-related information, which indicates that the lane keep control is being continued.

14. The control device for a vehicle according to claim 13, wherein
the display controller is configured to, during the lane keep control and the offset control,
display offset-related information, which is information related to the offset control, in addition to the lane-keep-related information, which is information related to the lane keep control, and
the display controller is configured to,
when the lane change is performed during the lane keep control and the offset control,
cause the display device to display the lane-change-related information, without waiting until the display device is caused not to display the lane-keep-related information and the offset-related information and
cause the display device to display the lane-keep-related information and the offset-related information in a mode, which indicates that the lane change is performed during the offset control.

15. A control method for a vehicle, the vehicle capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle, the control method to be executed by at least one processor and comprising:
automatically performing a lane change in a lane change control process; and
finishing the offset control and moving the vehicle to a center of a travel lane of the vehicle, in response to the lane change control process caused to perform the lane change during the lane keep control and the offset control, and subsequently causing the lane change control process to perform the lane change, in an adjusting process, wherein
when the lane change is performed during the lane keep control and the offset control and
when the travel position of the vehicle has been offset by the offset control in a direction in which the lane change is to be performed,
cause the performance of the lane change from the travel position of the vehicle, which has been offset by the offset control, and
when the lane change is performed during the lane keep control and the offset control and
when the travel position of the vehicle has been offset by the offset control in a direction that is opposite to a direction in which the lane change is to be performed,
finish the offset control and move the vehicle to the center of the travel lane of the vehicle and
subsequently cause the performance of the lane change.

16. A control method for a vehicle, the vehicle capable of performing automated driving including a lane keep control, which is to automatically perform lane keep of a vehicle, and an offset control, which is to automatically offset a travel position of the vehicle in a width direction of the vehicle by increasing a distance from an other vehicle, which travels side-by-side with the vehicle, the control method to be executed by at least one processor and comprising:
automatically performing a lane change in a lane change control process; and
causing the lane change control process to perform the lane change from the travel position of the vehicle, which has been offset by the offset control, in an adjusting process, in response to the lane change control process caused to perform the lane change during the lane keep control and the offset control, wherein
when the lane change is performed during the lane keep control and the offset control and
when the travel position of the vehicle has been offset by the offset control in a direction in which the lane change is to be performed,
cause the performance of the lane change from the travel position of the vehicle, which has been offset by the offset control, and
when the lane change is performed during the lane keep control and the offset control and
when the travel position of the vehicle has been offset by the offset control in a direction that is opposite to a direction in which the lane change is to be performed, finish the offset control and move the vehicle to the center of the travel lane of the vehicle and subsequently cause the performance of the lane change.

\* \* \* \* \*